US012420408B1

(12) United States Patent
Nikolovska et al.

(10) Patent No.: US 12,420,408 B1
(45) Date of Patent: Sep. 23, 2025

(54) HUMAN MACHINE INTERFACE RECIPE BUILDING SYSTEM FOR A ROBOTIC MANUFACTURING SYSTEM

(71) Applicant: Bright Machines, Inc., San Francisco, CA (US)

(72) Inventors: Lira Nikolovska, Jamaica Plain, MA (US); Tatjana Dzambazova, Mill Valley, CA (US); Benyamin Zinshtein, Hod Hasharon (IL); Nimrod Fridlin, Kfar Saba (IL); Ryan Werth, San Francisco, CA (US); Sagi Shoffer, Beit Arye (IL); Yaron Bental, Yakum (IL); Yaniv Knany, Yakum (IL); Shay Galperin, Yakum (IL); Sharon Goldstein, Yakum (IL); Calanit Ozeri, Yakum (IL)

(73) Assignee: Bright Machines, Inc., San Francisco, CA (US)

( * ) Notice: Subject to any disclaimer, the term of this patent is extended or adjusted under 35 U.S.C. 154(b) by 1035 days.

(21) Appl. No.: 17/380,000

(22) Filed: Jul. 19, 2021

Related U.S. Application Data

(60) Provisional application No. 63/203,325, filed on Jul. 16, 2021, provisional application No. 62/705,861, filed on Jul. 17, 2020.

(51) Int. Cl.
*B25J 9/16* (2006.01)
*B25J 9/00* (2006.01)
(Continued)

(52) U.S. Cl.
CPC ........... *B25J 9/1656* (2013.01); *B25J 9/0081* (2013.01); *B25J 9/1697* (2013.01); *B25J 13/08* (2013.01);
(Continued)

(58) Field of Classification Search
CPC ...... B25J 9/1656; B25J 9/0081; B25J 9/1697; B25J 13/08; B25J 9/08; G05B 19/4155;
(Continued)

(56) References Cited

U.S. PATENT DOCUMENTS 6,507,945 B1 * 1/2003 Rust .................... B01J 19/0046
700/1
7,047,099 B2 5/2006 Shanmugasundram et al.
(Continued)

FOREIGN PATENT DOCUMENTS

EP 3705239 A1 * 9/2020 ............ B25J 19/021
JP 2011-029324 A 2/2011
(Continued)

OTHER PUBLICATIONS

Wang, Lingfeng, and Kay Chen Tan. Modern Industrial Automation Software Design. John Wiley & Sons, 2006. (Year: 2006).*
(Continued)

*Primary Examiner* — Andrew L Tank
(74) *Attorney, Agent, or Firm* — Nicholson De Vos Webster & Elliott LLP; Judith Szepesi

(57) ABSTRACT

A recipe builder system, enabling control recipes for a robotic assembly system. The recipe builder system includes a visual interface for a recipe builder, and feedback on execution of the program on the visual interface.

20 Claims, 16 Drawing Sheets

(51) Int. Cl.
*B25J 9/08* (2006.01)
*B25J 13/08* (2006.01)
*G05B 19/4155* (2006.01)

(52) U.S. Cl.
CPC ............ *G05B 19/4155* (2013.01); *B25J 9/08* (2013.01); *G05B 2219/50391* (2013.01)

(58) Field of Classification Search
CPC ... G05B 2219/50391; G06F 8/20; G06F 8/71; G06F 8/60; G06Q 10/063
See application file for complete search history.

(56) References Cited

U.S. PATENT DOCUMENTS

| | | | |
|---|---|---|---|
| 7,248,936 | B1 | 7/2007 | Holmes et al. |
| 7,738,983 | B2 | 6/2010 | Yamaji et al. |
| 7,787,992 | B2 | 8/2010 | Pretlove et al. |
| 7,904,817 | B2 * | 3/2011 | Bergantino ......... G05B 19/0426 715/740 |
| 8,555,206 | B2 | 10/2013 | Pederson et al. |
| 8,589,874 | B2 | 11/2013 | Ralls et al. |
| 8,825,189 | B2 | 9/2014 | Moore et al. |
| 8,942,840 | B2 | 1/2015 | Chen et al. |
| 9,285,799 | B2 | 3/2016 | Zhou et al. |
| 9,387,589 | B2 | 7/2016 | Payton et al. |
| 9,465,384 | B1 * | 10/2016 | Jain .................. G06Q 10/06316 |
| 10,048,851 | B2 | 8/2018 | Yui et al. |
| 10,518,409 | B2 | 12/2019 | Oleynik |
| 2008/0097630 | A1 * | 4/2008 | Weatherhead ..... G05B 19/0426 700/86 |
| 2013/0046403 | A1 | 2/2013 | Nakagawa |
| 2017/0282374 | A1 * | 10/2017 | Matula ....................... B25J 3/00 |
| 2017/0348854 | A1 * | 12/2017 | Oleynik .................. A47J 47/02 |
| 2019/0291277 | A1 * | 9/2019 | Oleynik ................. B25J 9/1669 |
| 2019/0380794 | A1 * | 12/2019 | Al Jewad ............... A61B 34/20 |
| 2020/0016758 | A1 * | 1/2020 | Keller .................... B25J 9/1692 |
| 2020/0171671 | A1 * | 6/2020 | Huang ................. B25J 9/0084 |
| 2020/0310394 | A1 * | 10/2020 | Wouhaybi ........... H04L 67/1051 |
| 2020/0319630 | A1 | 10/2020 | Rudnitsky et al. |
| 2021/0138651 | A1 * | 5/2021 | Mcgregor ........ G05B 19/41885 |
| 2021/0141870 | A1 * | 5/2021 | McGregor ....... G05B 19/41885 |
| 2021/0149655 | A1 * | 5/2021 | Mathews .................. G06F 8/20 |
| 2022/0016780 | A1 * | 1/2022 | McDaniel .............. B25J 9/1666 |

FOREIGN PATENT DOCUMENTS

| | | | |
|---|---|---|---|
| WO | WO-2018176025 | A1 * | 9/2018 |
| WO | WO-2019021045 | A1 * | 1/2019 |
| WO | 2020/208267 | A2 | 10/2020 |

OTHER PUBLICATIONS

A. Angerer, A. Hoffmann, A. Schierl, M. Vistein and W. Reif, "The Robotics API: An object-oriented framework for modeling industrial robotics applications," 2010 IEEE/RSJ International Conference on Intelligent Robots and Systems, Taipei, Taiwan, 2010, pp. 4036-4041, doi: 10.1109/IROS.2010.5649098. (Year: 2010).*

S. Hart, P. Dinh and K. Hambuchen, "The Affordance Template ROS package for robot task programming," 2015 IEEE International Conference on Robotics and Automation (ICRA), Seattle, WA, USA, 2015, pp. 6227-6234, doi: 10.1109/ICRA.2015.7140073. (Year: 2015).*

C. Schlette et al., "3D simulation-based user interfaces for a highly-reconfigurable industrial assembly cell," 2016 IEEE 21st International Conference on Emerging Technologies and Factory Automation (ETFA), Berlin, Germany, 2016, pp. 1-6, doi: 10.1109/ETFA.2016.7733703. (Year: 2016).*

M. Priggemeyer, D. Losch and J. Roßmann, "Interactive Calibration and Visual Programming of Reconfigurable Robotic Workcells," 2018 IEEE/ASME International Conference on Advanced Intelligent Mechatronics (AIM), Auckland, New Zealand, 2018, pp. 1396-1401, doi: 10.1109/AIM.2018.8452707. (Year: 2018).*

S. Profanter, A. Breitkreuz, M. Rickert and A. Knoll, "A Hardware-Agnostic OPC UA Skill Model for Robot Manipulators and Tools," 2019 24th IEEE International Conference on Emerging Technologies and Factory Automation (ETFA), Zaragoza, Spain, 2019, pp. 1061-1068, doi: 10.1109/ETFA.2019.8869205. (Year: 2019).*

R. Wang et al., "A Formal Model-Based Design Method for Robotic Systems," in IEEE Systems Journal, vol. 13, No. 1, pp. 1096-1107, Mar. 2019, doi: 10.1109/JSYST.2018.2867285. (Year: 2019).*

* cited by examiner

HUMAN MACHINE INTERFACE RECIPE BUILDING SYSTEM FOR A ROBOTIC MANUFACTURING SYSTEM

RELATED APPLICATION

The present application claims priority to U.S. Provisional Application No. 62/705,861, filed on Jul. 17, 2020, and U.S. Provisional Application No. 63/203,325 filed on Jul. 16, 2021, and incorporates both of those applications by reference in their entirety.

FIELD OF INVENTION

The present invention relates to robotics, and in particular to automatic robotic assembly systems.

BACKGROUND

While automation equipment and methods have been available for manufacturing products for decades, such automation systems are not always employed, and instead human labor is still commonly used to perform tasks that are automatable.

Automation is Expensive and Time Consuming.

Common reasons for employing manual production labor over automation includes high capital costs of automation related equipment, high costs to engineer automation solutions, and the long time it takes to design, build, deploy, configure, program, and debug automation solutions. Companies wishing to automate a manufacturing task will often outsource the project to a system integrator who will commonly perform work from design to delivery in a way that is customized for the specific manufacturing product and process. While this custom-tailored approach may be more time and more cost efficient for a specific manufacturing project, it does not support efficient reuse of automation equipment or automation engineering to future products and projects. By analogy, a disposable paper cup is cost effective if you only plan to consume one cup of coffee in your life, but a more (initially) expensive reusable coffee mug is more cost efficient over a lifetime of coffee consumption.

Automation Tools are not Integrated into a Workflow Solution

Several tools exist to aid the engineering phase of an automation project (from design to delivery), such as Computer-Aided-Design (CAD) tools, simulation tools, programming tools, etc., but these tools are often focused on solving specific engineering tasks in isolation and not integrated into a full automation engineering workflow solution.

Additionally, building a process for robotic assembly or manufacturing is time consuming and requires being able to program all of the different elements of a robotic cell including a conveyor, cameras, robotic arm, end of arm tools, etc. This ensures that only experts can set up programs, and setting up a whole assembly line requires significant time and expertise.

BRIEF DESCRIPTION OF THE FIGURES

The present invention is illustrated by way of example, and not by way of limitation, in the figures of the accompanying drawings and in which like reference numerals refer to similar elements and in which.

Figure 1:
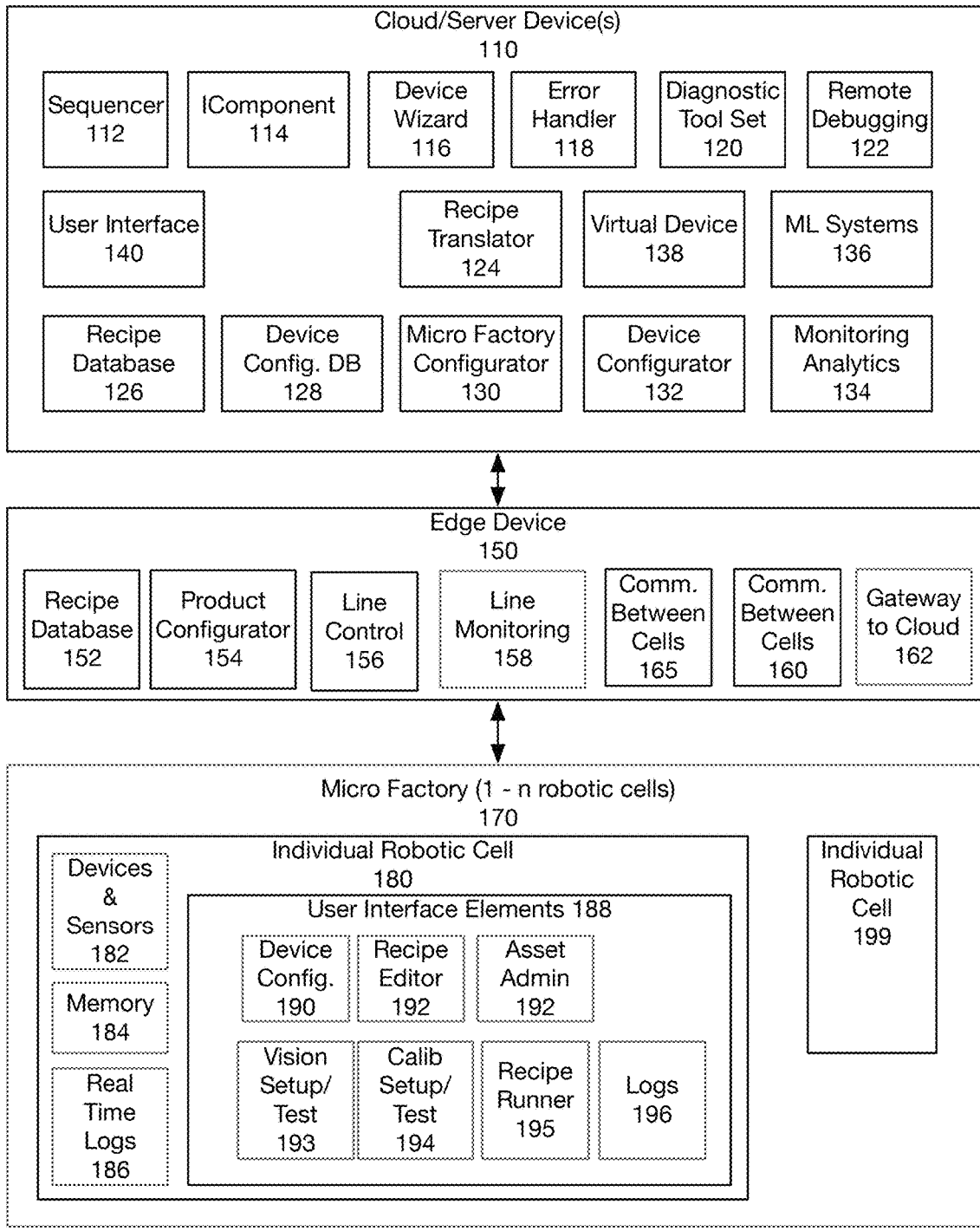
FIG. 1 is a block diagram showing one embodiment of the relationship between the server, edge device, and micro factory.

In addition to the above figures, screen shots of various embodiments of the user interface may be found in FIGS. 14A-14BQ and FIGS. 15A-15AD of U.S. Provisional Patent Application 63/203,325 filed on Jul. 16, 2021, and the Appendix to the Specification of U.S. Provisional Patent Application 62/705,861 filed on Jul. 20, 2020, which are fully incorporated herein by reference for all purposes.

DETAILED DESCRIPTION

The present application provides the ability to create a "recipe" as a set of instructions for commanding a micro factory, and individual robotic cells within the micro factory. In one embodiment, a unified environment for developing, deploying, and using such recipes is provided. In one embodiment, a WYSIWYG editor is used. The use of a WYSIWYG editor for industrial automation components is novel, and provides benefits for simplicity of interface and the ability for non-experts to create robotic assembly processes. In one embodiment, the design utilizes a linear visual metaphor that encapsulates non-linear logic in a linear visual motif while avoiding the spaghetti-like appearance and breadboard-like wiring of prior art visual and graphical systems. The recipe is human readable, and visually clear. In one embodiment, the human-machine interface, or HMI, described is an integration of one or more functionalities: cell configuration, station definition, recipe creation, device setup, robot lists creation, real-time logs, and error recovery.

Any automated physical assembly process, however complex, can be represented by a sequence of steps in which separated components are joined together. Here, automation refers to a step or task that is repeated on different individual parts, but the parts are all of a kind and the result of the tasks at each step are the same.

An automated assembly task attaches a part to a base, which requires moving the part being attached. One way of thinking about robotic assembly is that it is composed of various tasks including repetitive motions. Although no two specific individual assembly sequences are identical, the overall sequence of physical motions and logical conditions met will be the same, and the vast majority of automated assembly can be accomplished by a system that can be represented as a state machine. At any given point in time (or at any given step in the process) all variables in a state machine will have a specific logical value. Although, for example, a motor may be moving with a current anywhere in a safe range, the state of that motor that is salient for the overall assembly sequence, and what is represented in a state machine, is simply "running" or "not running.". This could be represented for example as a single bit Motor_running=TRUE. Now considering an assembly as a sequence of physical steps that can be abstracted or represented as a state machine, the most ubiquitous way that automation equipment is configured is by what is known to those in the field as a "recipe."

A "recipe" has been represented in many forms including: a list of steps, a flowchart, a series of entries in a spreadsheet, various data structures in code including lists and tables or even a physical representation such as series of relays. The specific representation will change based on the skills and experience of the person describing it. All have the features of being a step-wise sequence where every action starts and ends at a certain point in the sequence. This "list" is the fundamental structure that defines an assembly process.

The HMI recipe builder described provides a user of a computer-controlled automation system with the most direct connection between a recipe and its actualization by the automation machinery/robot. Other methods require various layers of abstraction, translation, re-factoring, and compiling that limit the set of users who can interact with the machinery based on specialist knowledge and—perhaps more crucially—make the tasks of debugging, tracing, error recovery, logging, and modification highly complex—so complex, that ancillary software systems are required to accomplish them.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

The current recipe building system provides a direct representation of this "recipe" to the user. In one embodiment, the representation shown may be based on the user's role in the system. The state of the recipe and the machine at any time are indicated simply by what step of the recipe was most recently completed. While preserving a clear linear representation of the recipe, the design supports sophisticated non-linear constructs including loop iteration, parallel and asynchronous execution, branching, jumping, and error recovery. The visual recipe editor interface described offers 'code-free' programming and controls environment and allows various modifications including program, debug, and test recipes to be done in a single environment. In one embodiment, variables and other code-based features may be layered on top of the code-free environment. An operator or technician may to run, change, debug using the same interface, without the need for a much higher paid control or automation engineer to run, program, or update the basic functions. Thus, the use of expert engineers is reduced, and a wider group of people beyond highly-trained experts can participate in automation.

The most widely used protocol for programming industrial automation is codified in the IEC standard 61131-3. It specifies four environments in which to generate compiled code that is sent to a controller:

Structured Text is a text-based language similar to Fortran

Instruction List is a compact text representation of steps similar to G-code

Function Block Diagrams is a sparse visual representation that represents functions graphically Ladder Logic combines visual elements and code to show execution.

Regardless of which environment is used to generate the controller code, a separate environment called an HMI or Human-machine Interface is created that exposes relevant parameters to a user. This requires configuring the same information in two contexts. The present recipe system described provides a single interface where the recipe is specified and where the state of the process is shown. It can be modified and the modification is seen immediately, in a direct analogy to WYSIWYG for the earliest graphical word processors.

FIG. 1 illustrates a diagram of one embodiment of the system layers. The cloud/server device 110 provides the systems that enable programming, monitoring, and providing analytics to the micro factory 170. The micro factory 170 includes one or more individual robotic cells 180. In one embodiment, an edge device 150 is interposed between the robotic cells 180 of the micro factory 170 and the cloud. The edge device 150 provides isolation of the robotic cells 180 from the cloud, and provides line configuration and monitoring features.

The present system, in one embodiment, enables interaction with the following elements:

Sequencer 112—a component that generalizes all drivers to act in a uniform way and by doing do it is able to orchestrate them.

IComponent 114—an abstraction to all drivers in the system. It allows the sequencer to act uniformly on all devices.

Device Wizard 116—is an application that allows an automation engineer to create a device that is standard and adhere to the system rules. It shares a significant amount of code for all devices by which it allows the system to be more robust and less error-prone.

Error Handling 118—part of the system code handling. In one embodiment, this may not be separate package.

Diagnostics toolset 120—a set of tools designed to describe the system status in history and real-time.

Remote debugging 122—enabling remote debugging of robotic cells.

The cloud/server 110 provides a user interface 140 in one embodiment, and a recipe translator. The cloud/server 110 in one embodiment also includes a memory to store recipes and configuration data. In one embodiment, the recipes are stored in a recipe database 126. In one embodiment, the recipe database 126 includes packaged recipes. Configuration database 128 includes the configured devices.

Micro factory or line configurator 130 configures a set of robotic cells, and their interaction, while the device configurator 132 configures individual robotic cells. Monitoring analytics 134 provides monitoring of the micro factory and individual robotic cells, as well as the edge device. The monitoring and analytics data is used by machine learning systems 136 to provide further analytics. In one embodiment, the cloud/server device 110 provides a virtual device 138 which mirrors the real robotic cell(s) in the micro factory. In one embodiment, the virtual device 138 may include visual representation of the robotic cell. In one embodiment, the virtual device 138 may be used to test recipes, and monitor the behavior of the real device(s).

Edge device 150 provides the buffer between the cloud/server 110 and the micro factory 170. In one embodiment, the edge device 150 is used to insulate the micro factory 170 to ensure that no malicious entity or software can access the robotic cells 180. In one embodiment, the edge device 150 also provides an off-line capability for the micro factory 170, in which the controls, updates, monitoring, and analytics are provided locally even when a network and thus access to the cloud/server 110 is not available. The edge device 150 in one embodiment is physically co-located with the micro-factory 170, and thus serves a single location. Thus, the edge device 150 can access the robotic cells 180 in the particular micro-factory 170. In one embodiment, each micro-factory 170 has an associated edge device 150.

The edge device 150 in one embodiment includes a gateway to the cloud 162. In one embodiment, the edge device 150 may also provide communication 160 between the robotic cells and other devices in the micro factory. The edge device 150 includes in one embodiment recipe database 152 and product configurator 154.

In one embodiment, while the micro factory 170 is being used, the edge device 150 provides line control 156 and line monitoring 158. In one embodiment, the edge device 150 includes a user interface 165 enabling configuration of the micro factory 170 and individual robotic cells 180 from the edge device.

The micro factory 170 includes one or more individual robotic cells 180, 199. Each cell 180 includes devices and sensors 182, and configuration and recipe data stored in memory 184. The robotic cell 180 includes logging capabilities, which provide real-time logs 186 of the data from the devices and sensors, so that the cell can be monitored. In one embodiment, the robotic cell 180 includes a user interfaces 188. The user interface elements 188 allow a technician to directly alter the functioning of the robotic cell 180. The user interface elements 188 include device configuration 190, recipe editors 192, asset administration 192, vision and calibration setup and testing 193, 194, recipe runner or operator 195, and logs 196. In one embodiment, the recipe editors also provides access to predefined robot position lists, or enables the use of a control pendant to enter position data. In general, recipes and configuration creation is done in the cloud/server 110, but in one embodiment there is a human-machine interface on the robotic cell 180 itself. In one embodiment, the below processes of editing and creating recipes may thus be executed directly on a robotic cell. In one embodiment, the user interface presentation on the cloud/server 110, edge device 150, and micro factory 170 may be consistent. This allows smooth movement from cloud to the actual physical robot, without requiring separate learning curves.

Figure 2:
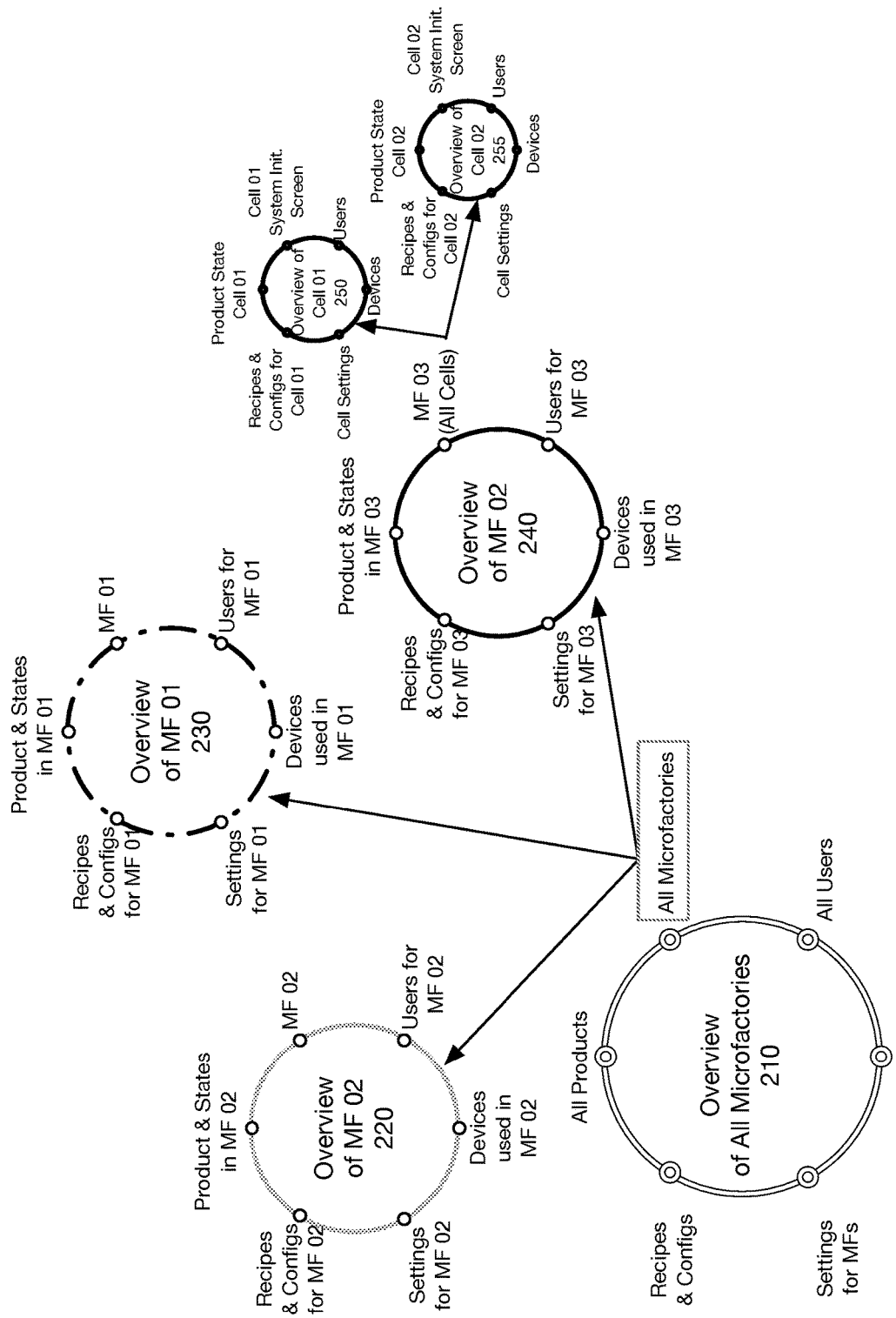
FIG. 2 is a diagram showing one embodiment of the relationships between the various systems.

FIG. 2 illustrates the relationship between the systems, from all micro factories to individual robotic cells. Each level has products, users, devices, settings, and station/recipes/configurations. In one embodiment, each higher level receives the data from the lower levels. The individual cells 250, 255 include users, devices, cell settings, stations, recipes and configurations, product state data, and system screen. The micro factory 240 including those to cells 250, 255 includes in addition the products and states for all devices in the micro factory. The overview of all micro factories 210 includes data from all micro factories supervised by the overview. In one embodiment, user interface at each level provides similar data and presentation, enabling a cohesive picture, and also enabling users to interact with the system at various levels. In one embodiment, the users do have tiers of access, based on their authorization, and logging in provides the user interface associated with the user's level of access.

The dominant metaphor for all visual languages is to replicate the physical world. Each "node" is a function where the outputs of one node are connected ("wired") to an input of another node. This approach is consistent regardless of the domain: architecture, music, graphics, data analysis, controls, etc. The oldest and most comprehensive visual programming environment is LABVIEW™ by NATIONAL INSTRUMENTS. This type of interconnective illustration means that actual projects, with their complexity, end up with a lot of wires and interconnections. This is often referred to as spaghetti or spaghetti code—the complexity of a given program is directly represented by the visual complexity of the user interface.

The present system decouples the complexity of the code and complexity of the display, in one embodiment. The recipe system described does this by connecting elements in time or sequence. The parameters required for each function are encapsulated within each node. There is no need to track, pass, and wire variables between steps. The location in the recipe fully captures the state. This framework visually shows a form familiar to anyone in the field of industrial automation, without the spaghetti.

Figure 3:
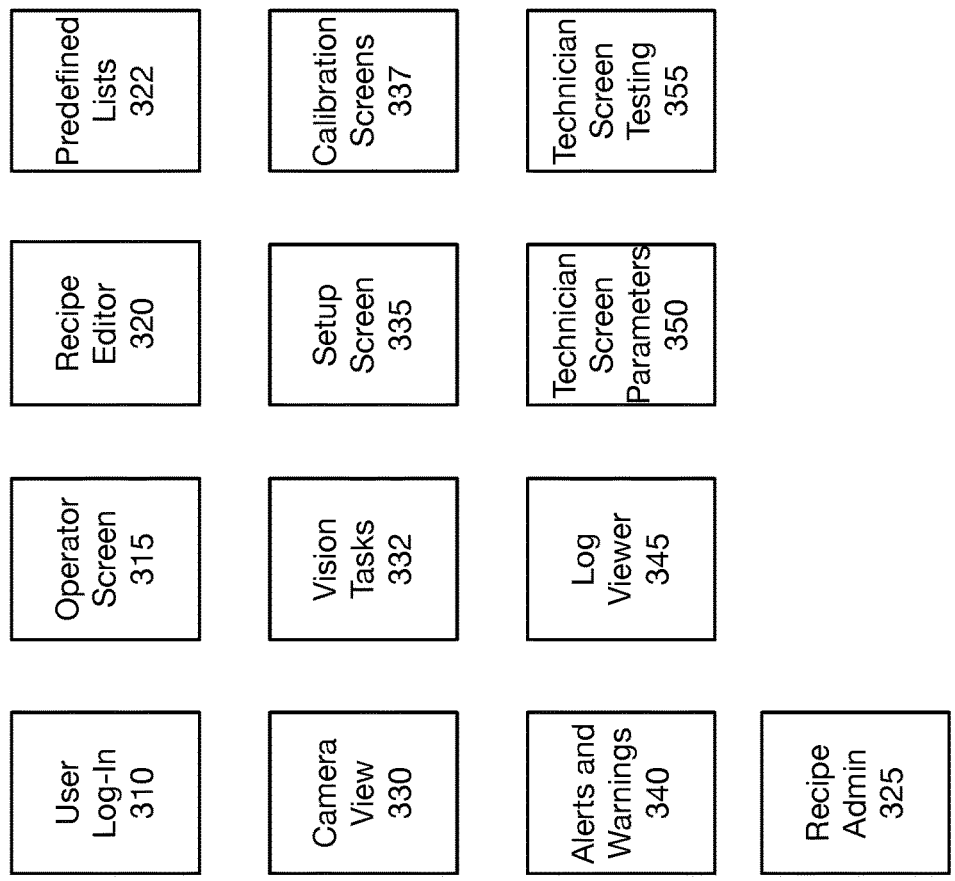
FIG. 3 is a diagram illustrating an exemplary set of user interfaces available through the same HMI system.

Context switching is always a cost to any user of a system. Changing from one screen or set of symbols to another requires time, additional training and cognitive effort that ultimately increases the time and chance of error in making those changes. In many domains of software, unifying previously disparate functions under one interface requires a novel approach. The current domain of industrial automation is no different. Tools remain siloed or separate, not due to underlying technical or programming challenges, but because of visual clutter. In one embodiment, the decoupling and simplification allows the present system integrate elements. FIG. 3 illustrates one embodiment of the elements which may be integrated including:

Operator screen 315
Recipe Editor 320
Predefined Lists (of robot positions) 322
Log Viewer 345
Alerts and Warnings 340
Vision Setup and Testing 332
Camera view 330
Set up screen to set up Devices 335
Calibration screens 337
Technician screen to define parameters and test 350/355
Recipe Admin 325
User Login 310

Figure 4:
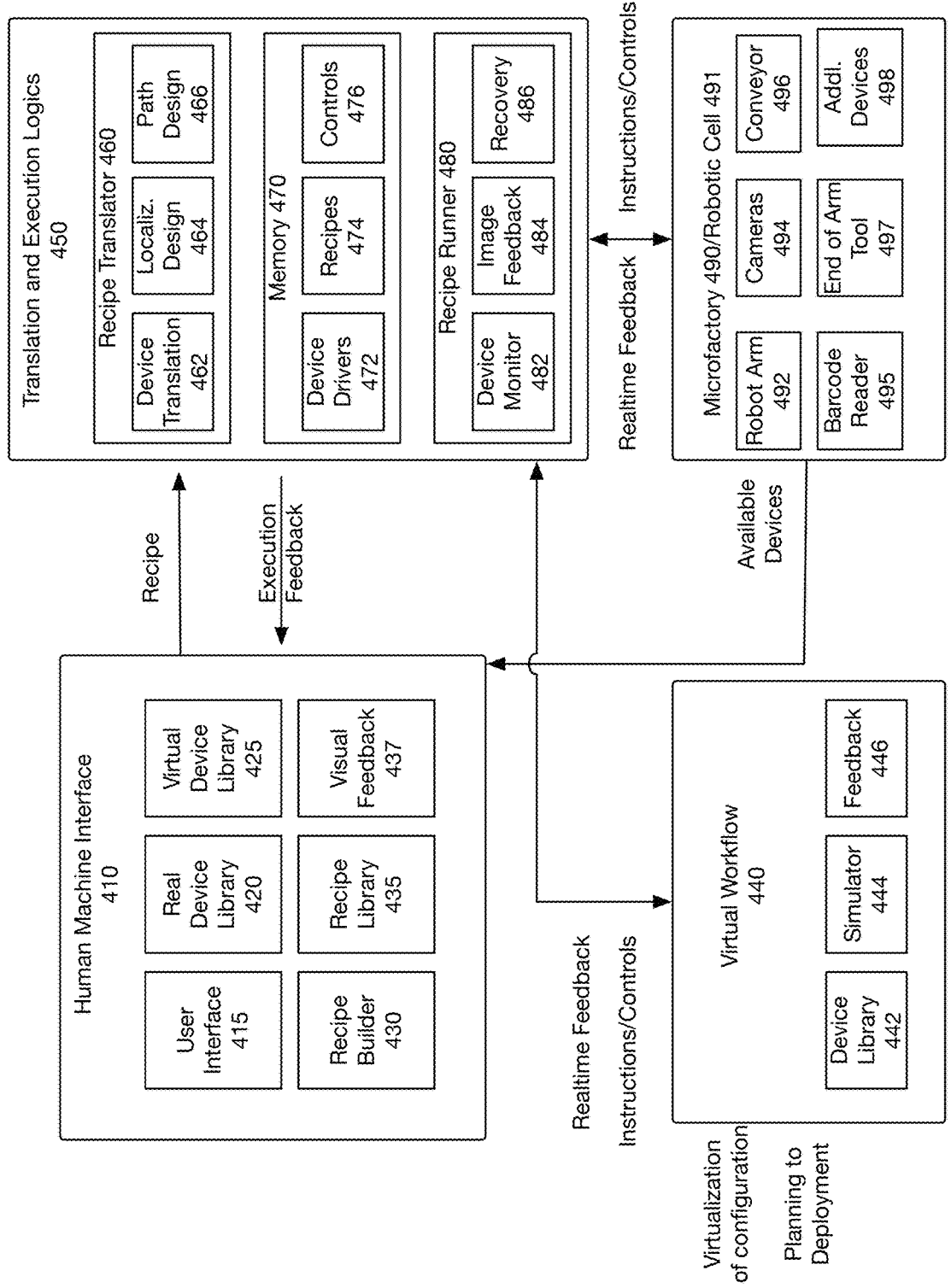
FIG. 4 is a block diagram of one embodiment of the elements of the recipe system.

FIG. 4 is a block diagram of one embodiment of a Recipe Design System, for a robotic cell, and a robotic line. The system includes a human machine interface 410, translation and execution logic 450, virtual workflow 440, and in one embodiment a micro factory 490/robotic cell 491.

The human machine interface 410 provides a user interface 415, access to a real device library 420 and/or a virtual device library 425. The human machine interface 410 includes a recipe builder 430, which enables a user to build a recipe. Recipe library 435 stores the packaged recipes. In one embodiment, the recipe library 435 is available to the recipe builder 430. Visual feedback 437 provides the visual display of the recipe building process. Embodiments of the visual interface are illustrated in FIGS. 14A-14BQ and FIGS. 15A-15AD of U.S. Provisional Patent Application 63/203,325 filed on Jul. 16, 2021, and the Appendix to the Specification of U.S. Provisional Patent Application 62/705,861 filed on Jul. 20, 2020, which are fully incorporated herein by reference for all purposes. The human machine interface 410 may reside on a cloud based system, on a local edge device, or on the individual robotic cell.

The recipe created via the human-machine interface in one embodiment, is stored in memory. The translation and execution logics 450 translates the recipe via recipe translator 460 to the particular commands needed for the elements that perform the actions. Thus, the recipe translator 460 in one embodiment provides one or more of: device translation 462, localization of the design 464, and path design 466.

The memory 470 stores device drivers 472, recipes 474, and controls 476, in one embodiment.

Recipe runner 480 runs the recipe on a virtual device or a physical robotic cell. The recipe runner 480 also includes a device monitor to receive real-time sensor data from the robotic cell 491 or virtual system. Image feedback 484 in one embodiment provides a three dimensional representation of the cell, so that the user can observe each action of the cell as it is executed. In one embodiment, the image feedback 484 also enables re-running of a recipe, to observe its function. Recover 486 enables the system to run recovery recipes, as will be discussed below. The translation and execution logic 450 may reside on a server system, an edge device, or directly on a robotic cell. The micro factory 490/robotic cell 491 provides various elements, in some embodiments including robot arms 492, cameras 494 or other sensors, conveyors 496, bar code readers 495, end of arm tools 497, and additional devices 498.

The virtual workflow 440 provides virtualization that allows a simulation of the process, using simulator 440, and feedback 446. In one embodiment, the same recipe may be run on the virtual workflow 440 and the robotic cell 491, enabling testing of the process.

Figure 5A:
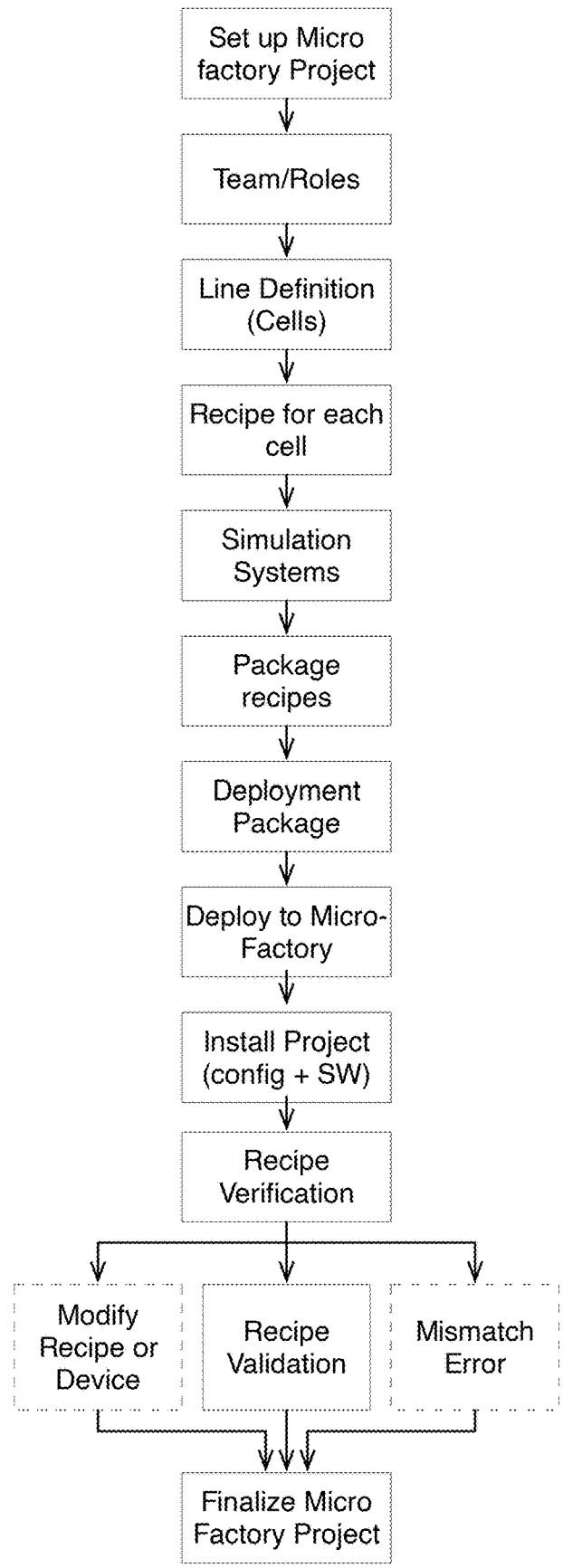
FIG. 5A is an overview diagram of creating a microfactory project.

FIG. 5A is an overview diagram of creating a micro-factory project. Setting up a micro-factory project initially includes identifying team members and associated roles. In one embodiment, the roles define the user interface features available to team members. The set-up then includes a line definition, which defines one or more cells that make up the micro-factory. The definition of each cell includes the set of devices within the cell. The line definition further includes the interaction between the cells, e.g., the conveyors trays, and other data that provide the elements to each cell. A recipe is then defined for each cell. The recipe uses one or more of the devices within the cell.

In one embodiment, the micro factory, cells, and recipes may be tested using simulation systems.

The recipes are then packaged. Recipe packaging incorporates all of the dependent elements and library elements which are referenced or utilized in the recipe. The deployment package is then created. The deployment package includes the definition of the micro-factory set-up as well as the packaged recipe. The package can then be deployed to a micro factory. Deployment includes installing the project and the software, in one embodiment. The recipe verification ensures that the deployed cell configuration and recipe match are met by the micro factory on which the recipe was deployed. In one embodiment, when the recipe is validated the micro factory project is finalized. In one embodiment, if the verification fails, the recipe or the device configuration may be modified either automatically or by a user. If the modification cannot be made, it is a mismatch error.

Figure 5B:
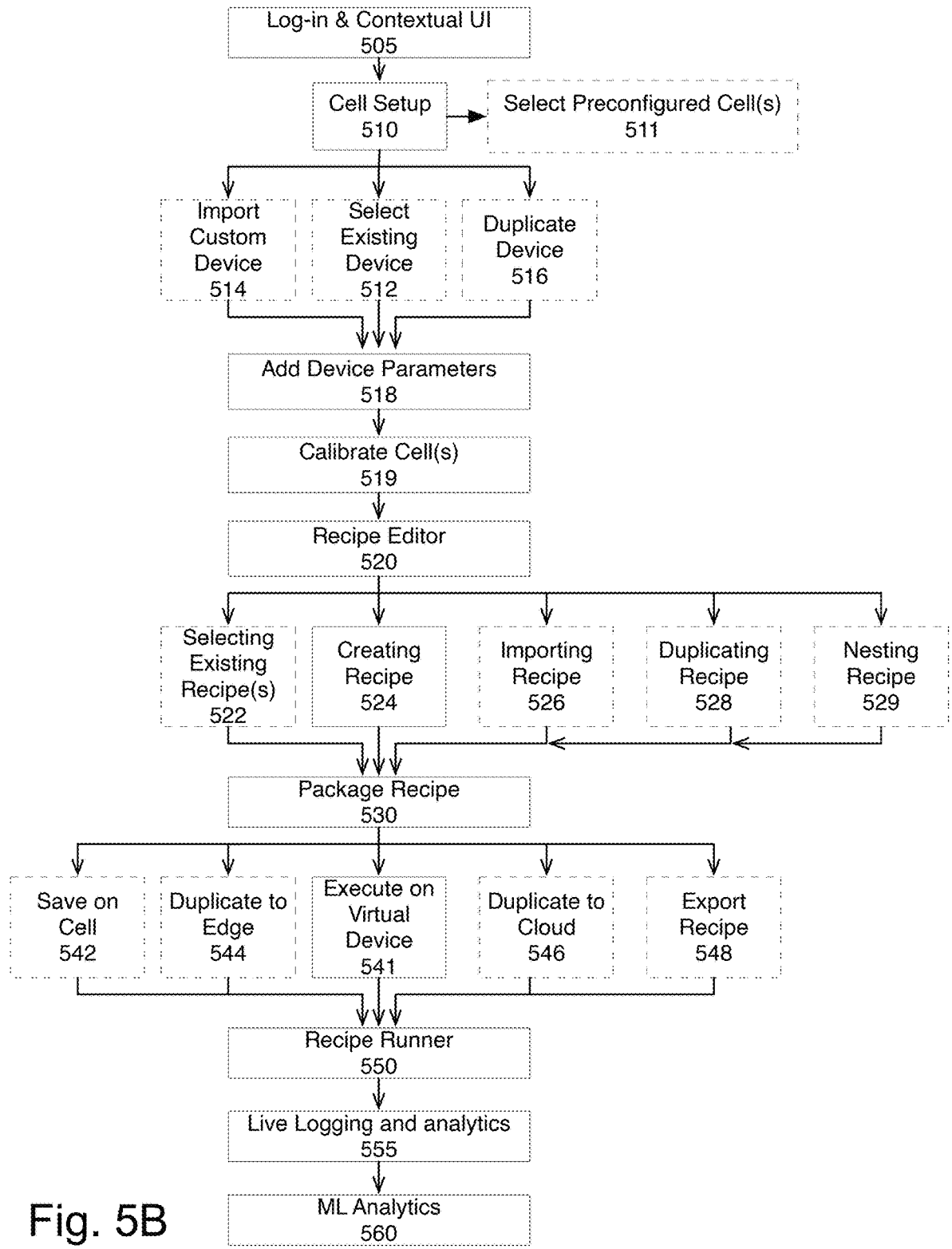
FIG. 5B is a flow of one embodiment of building a recipe.

FIG. 5B is a chart of one embodiment of utilizing a Recipe Design System for a robotic cell. In one embodiment, the system starts with a log-in contextual user interface. The contextual user interface provides the subset of features available to the logged in user. The cell setup 510 enables the user to set up a cell, or select a preconfigured cell 510. Setting up a cell includes selecting device(s) 512, importing customized devices 514, or duplicating existing devices 516. A device may include for example a robotic arm, a conveyor, a camera, etc. Once a device is selected, in one embodiment, the relevant parameters for the device are added 518. The parameters may be added via a configuration screen. In one embodiment, imported devices may include defined parameters.

The cell is then calibrated 519.

The recipe editor 520 in one embodiment is available via a web interface and/or via an interface on the robotic cell itself. In one embodiment, a single recipe editor 520 may be used whether the recipe is being built on the robotic cell's own system or remotely. This enables the use of a single interface and consistency regardless of the system being used. In one embodiment, the recipe editor 520 is associated with a particular robotic cell. In one embodiment, the system obtains the list of actual devices associated with the robotic cell. If the recipe is being built on a virtual version of the cell (e.g., a digital representation of a robotic cell) it similarly obtains the relevant set of devices which are available for use.

With the recipe editor the user may choose to create a recipe 524, which will be discussed below. The user may also choose to select an existing saved recipe 522, or import a recipe 526. The user may duplicate an existing recipe 528, or select a nesting recipe 529. Recipes are imported if they were initially created on a different system. Recipes may be imported from a shared repository, or from an external memory, such as an external drive or memory stick. When the user opens an existing recipe or imports a recipe, in one embodiment the system verifies that the robotic cell that is being programmed for has the appropriate devices for the recipe. The recipe packager 530 packages the recipe, which includes the configuration of the cell it's associated with, as well as all of the steps of the recipe.

The recipe may be saved on a cell 542, duplicated to an edge device 544, duplicated to the cloud 546, or exported 548. In one embodiment, the recipe may be run on a virtual device 541. Running the recipe triggers recipe runner 550.

While the recipe is run, whether on an actual cell or a virtual device, the system provides live logging and analytics 555. The live logging and analytics 555 provide real-time data from the sensors on the cell or virtual device. In one embodiment, when the recipe is being run on the physical cell, the virtual device runs in parallel and reflects the actual data from the cell. In one embodiment, the data from one or more runs of the recipe may be used by machine learning (ML) analytics 560.

Figure 6A:
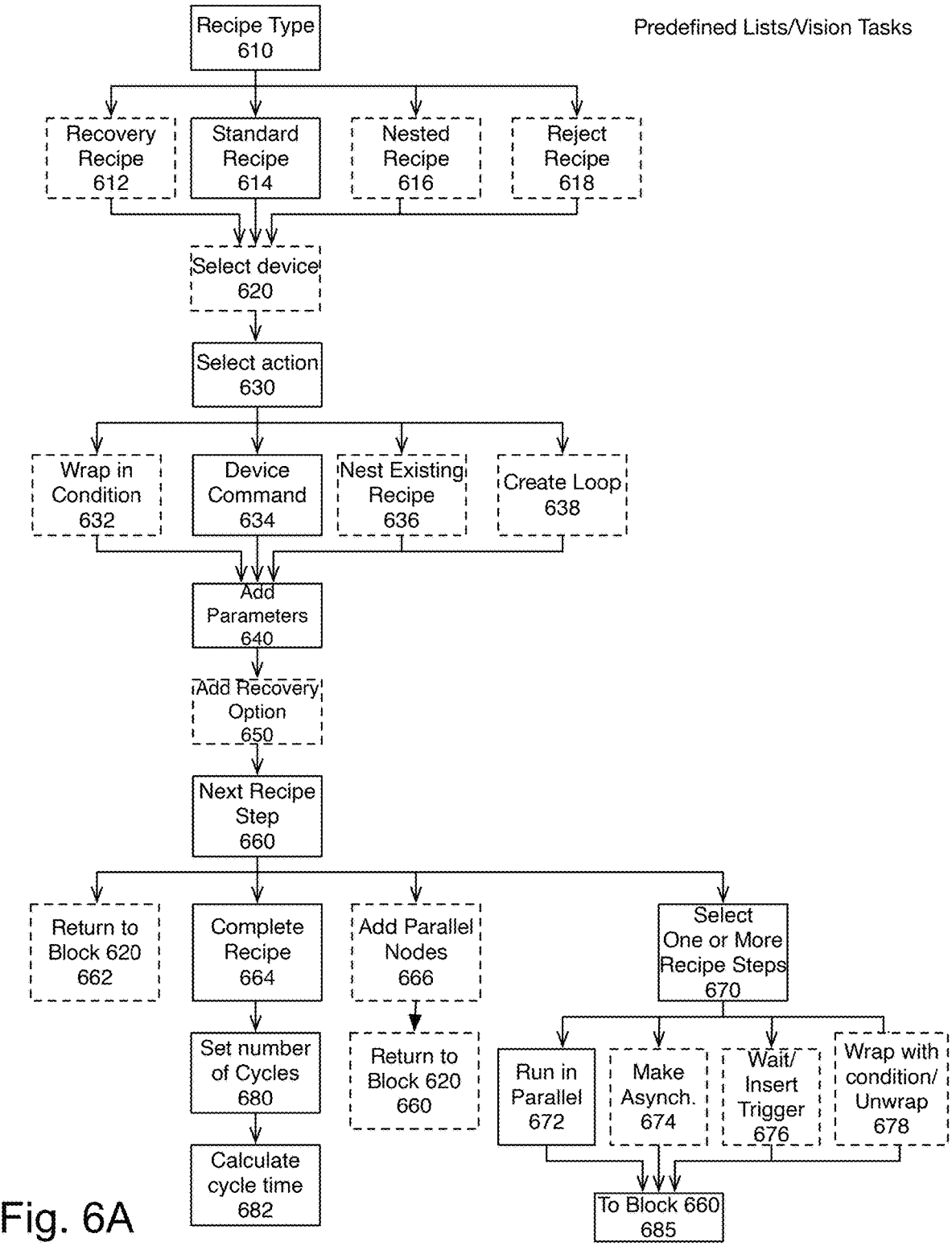
FIG. 6A is a flow of one embodiment of putting together recipe elements.

FIG. 6A is a chart of one embodiment of implementing a recipe. The recipe type is selected 610 The recipe type may be a standard recipe 614, a recovery recipe 612, a nested recipe 616, or a reject recipe 618. A recovery recipe 612 is a set of commands and processes which occur after a particular error is detected. By enabling the user to create recovery recipes, the system can address complex processes to recover. A nested recipe 616 is a recipe segment that is nested within another recipe.

The device is selected 620. The user in creating a recipe adds a device to act on 620, in one embodiment. Each of the actions in the recipe is associated with a device or a logic. The device is any controllable device that is present in the particular robotic cell that the user is working with. For example, the device may be a robotic arm, an end of arm tool, a camera, a conveyor belt, or another controllable part of the robotic cell for which the program is being written. A logic may be a logic such as wait-for, or loop, which will be discussed in more detail below. In one embodiment, vision tasks are included to ensure that the sensors and cell are properly configured and calibrated.

The action to be taken by the device is then selected 630. The action may be a device specific command 634. A device specific command for example may be to close a gripper, turn a screw driver, move a conveyor belt, etc. The action may be a wrap-in condition 632. A wrap-in condition creates a conditional action. The conditional action may be an if-then condition or an if-then-else type condition. The action may be to nest an existing recipe 636. Nesting an existing recipe inserts a predefined set of process steps associated with the selected device. The action may be to create a logic process 638, such as a loop or wait-for trigger.

Parameters are then added 640. The parameters define the detailed execution of the action. By separating the selection of the action and the parameters, the system can present data in a clear way to the user. In one embodiment, parameters may be selected from a predefined list. For example, parameters for moving a part may be defined from a list of positions. For example, the user may select a screw driver (tool end), indicate that the action should be to turn the screw driver, and then set parameters of how far the screw driver should be turned and/or what level of torque should be applied to the screw driver and/or what distance the screw should move before the screw driver stops turning. In one embodiment, the system presents a "parameters" screen to the user, after the device and device specific command are defined, enabling defining the parameters. In one embodiment, the parameters screen includes all available parameters based on the sensors and data available within the robotic cell. In one embodiment, parameters can be global or local. Global parameters may be separately set, while local parameters are in the recipe editor on the right side, under parameters Optionally, the user may be able to add a recovery option 650, after selecting the parameters. As noted above, recovery options 650 are processes executed if the actions defined by this recipe step cannot be successfully executed. For example, if the example is the screw driver example above, there may be a recovery if it turns out that the screw driver didn't successfully engage with the screw head. The recovery option may be to lift the tool from the screw head, and re-execute the process of inserting the tool tip into the screw. In one embodiment, there may be multiple recovery options, depending on the failure mode encountered. In one embodiment, additional features, such as the use of local or global variables, and multi-directional dependencies may also be added.

The next recipe step is then selected 660. The next recipe step may be to return to block 620 to select the next device for the next action 662. The next recipe step may be to add a parallel node 666. A parallel node is one or more actions executed in parallel with this action. If the user selects adding a parallel node, the process creates a UI display showing the parallel nodes, and returns to block 660.

In one embodiment, the user may select one or more recipe steps 670 to alter their relationship. This alteration may be to select the steps to run in parallel 672, to select the steps to run asynchronously 674, to add a wait-for or trigger condition for the set of steps 676, to wrap the steps with a condition, or to unwrap the steps 678. The ability to do this, at any time during the recipe creation or editing process, provides a high level of flexibility. The recipe steps may also be moved within the flow, re-ordering them at any time.

Selecting steps to run in parallel 672 wraps the multiple recipe steps into a parallel format. In one embodiment, visually the parallel elements are displayed indented with a label showing that they are executed in parallel.

Selecting steps as asynchronous 674 means that they are executed in any order, and there is no dependency between such asynchronous steps.

The multiple recipe steps may be set to trigger based on time (wait) or based on another trigger 676. For example, the system may trigger an action after a second has elapsed, or after some trigger has occurred. The trigger in one embodiment may be external to the recipe, and even external to the robotic cell in one embodiment. The process then may return to block 660, to either return to block 620, complete recipe, or take another action, or complete the recipe.

The next step 660 may be completing the recipe 664. If so, the number of cycles for the recipe is set 680. The system then calculates the cycle time 672, e.g., the time it would take to execute all of the steps in the recipe. By making the cycle time available the user may be able to evaluate the efficiency of the process. Takt time (or cycle time) is important evaluating recipes and processes.

The recipe may then be saved. A saved recipe may be run on the robotic cell, may be shared to others, and may be further edited at a later time. Additionally, saved recipes may be included in new recipes, as a nested/existing recipe. This enables the building up of complex robotic cell processes using an intuitive and visual system.

Figure 6B:
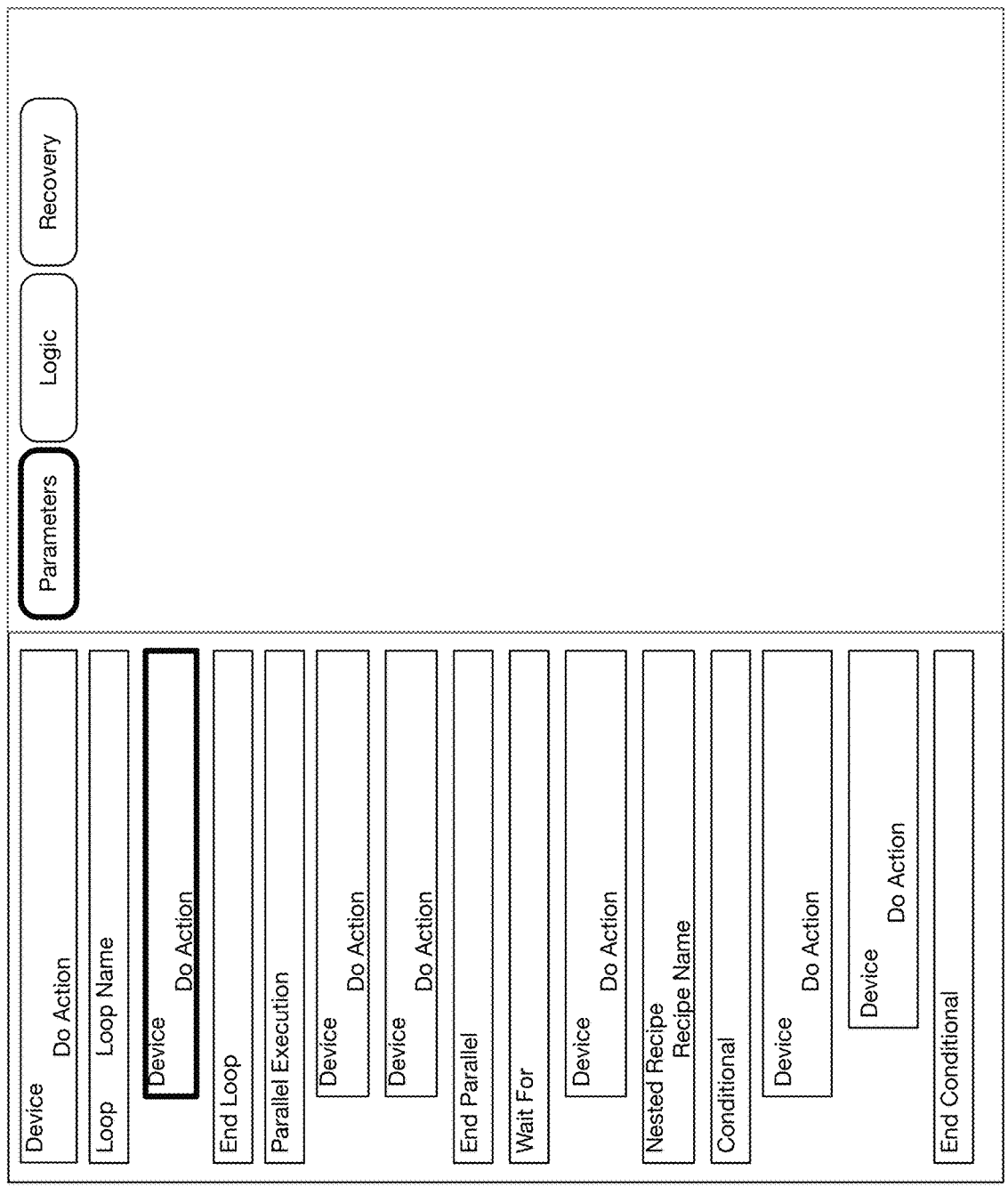
FIG. 6B is an exemplary recipe display.

Visually, the process is illustrated as a flow, showing each of the steps. FIG. 6B illustrates one embodiment of the visual flow of a recipe. In one embodiment, the selected action (here the Device-Action) has its associated parameters, logic, and/or recovery displayed on the right hand side. By creating separate visual display for selecting parameters, automatic recovery, and other aspects, the baseline recipe can be visually easily analyzed, while complex and interdependent elements interact. In one embodiment, the elements in parallel execution are independent elements. In one embodiment, conditional elements may depend on one or more conditions being met, and may include if-then type of conditionals as well as if-then-else, and other types of conditional structures.

Figure 7:
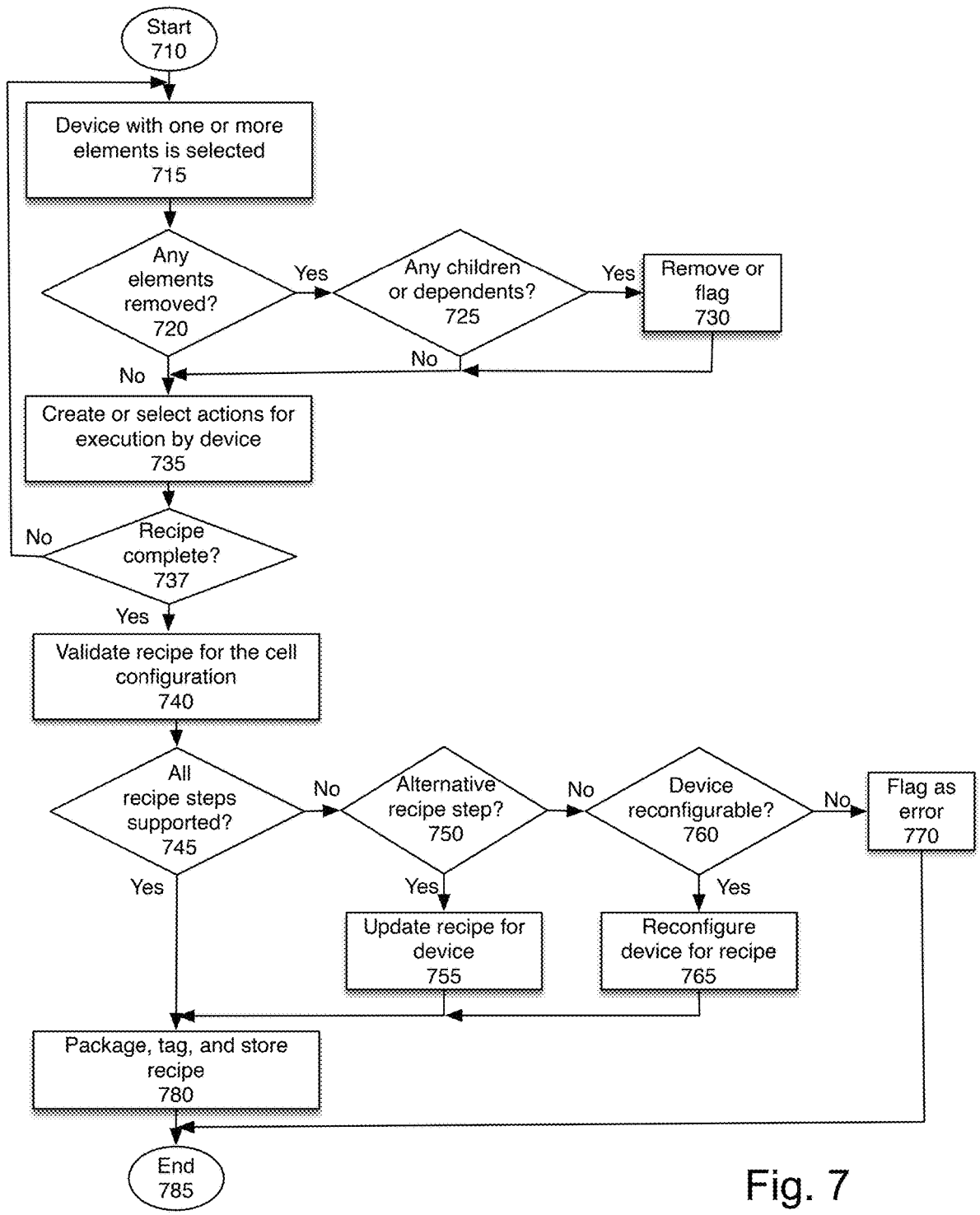
FIG. 7 is a flowchart of one embodiment of recipe creation.

FIG. 7 is a flowchart of one embodiment of recipe creation. The process starts at block 710. At block 715, a device with one or more elements is selected. At block 720, the process determines whether any of the elements have been removed. If not, the process continues to block 735. If an element has been removed, at block 725 the process determines whether there are any child elements or dependent elements from the removed element. If not, the process continues to block 735. If so, those child or dependent elements are removed and/or flagged at block 730. The process then continues to block 735.

At block 735, the system creates or selects one or more actions for execution by the device. In one embodiment, the actions may include multiple steps which may be parallel, sequential, or asynchronously executed.

At block 737, the process determines whether the recipe is complete. If not, the process returns to block 715, to select a device for the next action.

At block 740, the system validates the recipe for the device configuration. This ensures that each of the actions taken are supported by the devices and sensors available in the robotic cell and/or micro factory.

At block 745, the process determines whether all recipe steps are supported by the system. If so, at block 780 the recipe is packaged, tagged, and stored. Packaging the recipe, in one embodiment, includes the cell configuration data, parameters, UI features, and other data with the recipe, so that it can be loaded onto a cell or a virtual device. Tagging adds tags which enable classification of the recipe for reuse and searching in a directory. In one embodiment, tags may include identification of the recipe as a recovery recipe, a reject recipe, a nested recipe, etc. In one embodiment, the tagging may also include constraints of the recipe. The recipe is then stored. In one embodiment, stored recipes are made available to others. Recipes may be reused, duplicated, and embedded into other recipes. In one embodiment, once a recipe is stored, it is retained in storage unless it is deleted. If it is modified, each version of the recipe is retained.

If, at block 745, the process determined that one or more of the recipe steps were not supported, the process continues to block 750. At block 750, the process determines whether there is an alternate and/or additional action for the unsupported action that is supported by the cell as configured. If so, at block 755 the recipe is updated, to conform to the capabilities of the cell. For example, if there is an action in which the system tightens a screw, but the screw is not in the right location, the system may add an intervening step of moving the screw driver screw driver. In one embodiment, if there is missing a prior action for an action, the system may insert it. The process then continues to block 780 to package, tag, and store the recipe.

If there isn't an alternative recipe step that fixes the issue, the process continues to block 760. At block 760, the process determines whether the device configuration should be altered to enable support for the recipe steps. For example, if there is a command to tighten a screw, but the tool tip is not a screw driver, the system may reconfigure the device for the recipe by changing the tool tip, at block 765. The process then continues to block 780 to package, tag, and store the recipe.

If neither the actions nor the device can be automatically reconfigured, at block 770 an error is flagged, and the process then ends at block 785.

Figure 8:
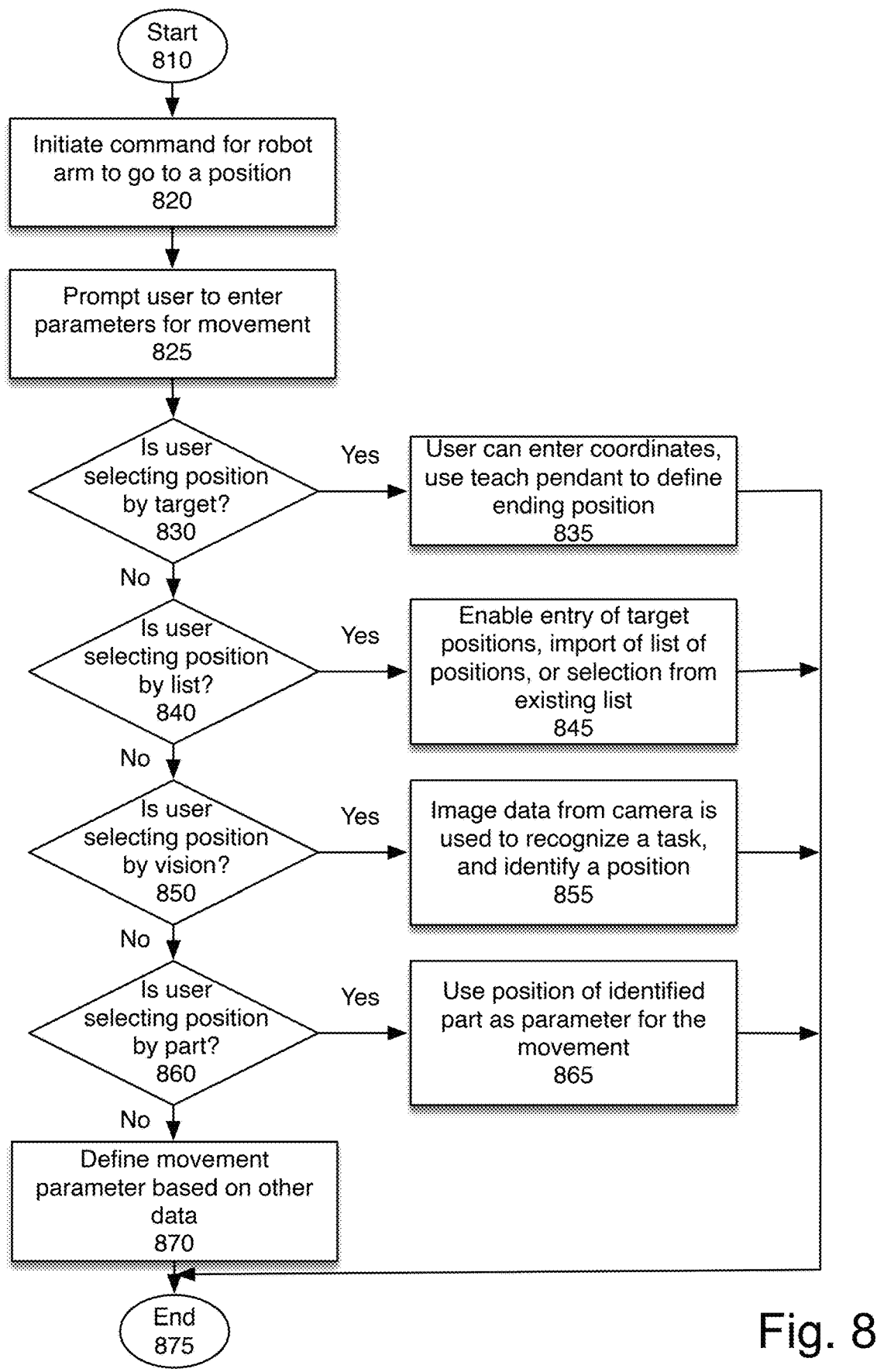
FIG. 8 is a flowchart of one embodiment of selecting a position-based command for an element in a robotic cell.

FIG. 8 is a flowchart of one embodiment of selecting a position-based command for an element in a robotic cell. The process starts at block 810. At block 820, the user adds a device-specific command to move an element, such as the robotic arm, to a position. The user is prompted to enter the parameters for the movement. The parameters define where the robotic arm (or another device) will move to.

At block 830, the process determines whether the user choose to select the parameter based on position. Position in one embodiment is position in the X, Y, Z space of the robotic cell. If so, the user may enter the coordinates manually in one embodiment, at block 835. In one embodiment, the user may also utilize a teach pendant (or joystick) to demonstrate the end position for the robotic arm, at block 835. The process then ends at block 875.

At block 840, the process determines whether the user choose to select the parameter from a list. A list of positions may be created by the user manually by entering coordinates. The list of positions may be imported (in one embodiment from a CSV spreadsheet). The list of positions may be created with a teach pendant of the robot or by a robot program. The list of positions may be linked to be read from a vision task/device. The list of positions may be selected from an existing list. The user selects the position from the list, at block 845. In one embodiment the positions on the list may have names, in addition to having coordinates. The process then ends at block 875.

At block 850, the process determines whether the user choose to select the parameter based on visual data. Visual data from the camera is used to recognize a task, and identify a position. The visual data may be used to determine the position for the robotic arm. For example, visual data may be used for a step in which the camera should be in a specific position to take a snapshot of a barcode on a part, to identify the part and to register that the specific part is used during assembly.

The visual data is used for the position 855. In one embodiment, this means that the recipe, when executed, relies on real-time image data for the movement, rather than having a pre-calculated position to go to. The process then ends at block 875.

At block 860, the process determines whether the user choose to select the parameter based on a part. The part, in one embodiment, is the part to be assembled, which has a particular set of coordinates associated with it. If the parameter is based on a part, at block 865, the identified part is used as a parameter for the movement. The process then ends at block 875.

Otherwise, at block 870, the movement parameter is defined based on other data. The data may be any data available to the robotic cell. The specific data which defines the movement parameter is not key. The ability to define a position to move to, separate from the movement and device selection, and based on various types of data provides a visually uncluttered interface while still providing the full range of flexibility. The process then ends at block 875.

Figure 9:
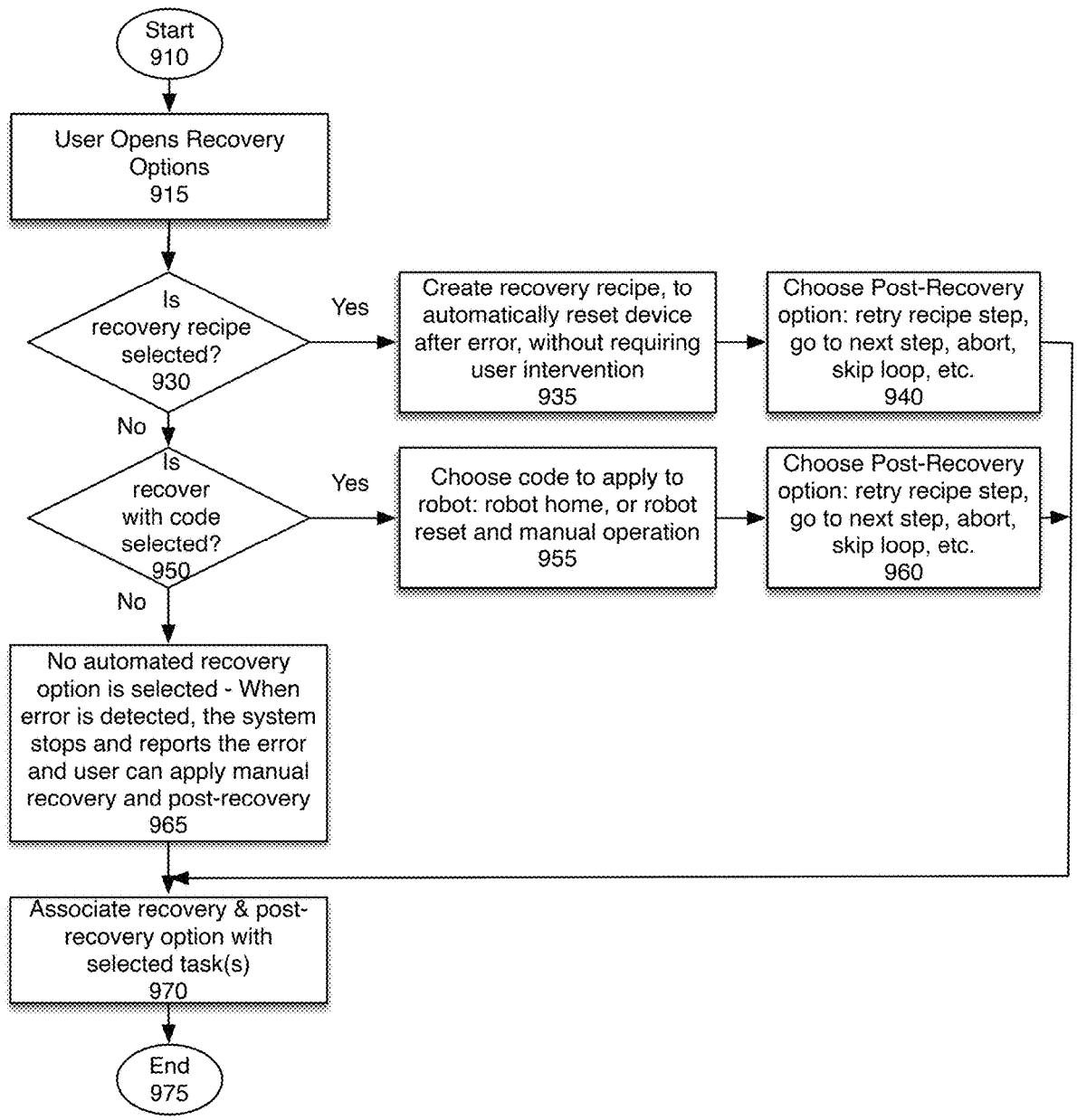
FIG. 9 is a flowchart of one embodiment of applying recovery options to a step in a recipe.

FIG. 9 is a flowchart of one embodiment of applying recovery options to a step in a recipe. As noted above, the user may choose to add a recovery option for any task that may fail. In one embodiment, tasks may have one or more recovery options associated with them. In one embodiment, some tasks that cannot fail may not have a recovery option. The process starts at block 910. At block 915, the user opens the recovery options menu. In one embodiment, the recovery options may be added for one or more tasks at a time.

At block 930, the process determines whether the user elects to add recovery option. If so, the user may create a new a recipe to or add a saved recipe at block 935. This recovery recipe automatically initiates an assigned process after a device fails to perform the selected operation, without user intervention. The user may include post-recovery options. Post recovery options in one embodiment may include retrying the same step again, going to the next step, aborting the process, skipping or ending the current loop. Other post-recovery options may be used. The process then continues to block 970, where the selected recovery and post-recovery options are associated with the selected tasks. The process then ends at block 975.

A second alternative for recovery is utilizing a code based recovery. Codes are particular pre-programmed processes that may be used for recovery. For example, there may be code based recovery options for processes such as going "home" (a safe neutral position, in one embodiment), or resetting and shifting to manual operation. The post-recovery options in one embodiment may also be selected here. The process then saves these options, at block 970. In one embodiment, the user may associate multiple recovery options with a single action. In one embodiment, the recovery options may be conditional, and selected based on the type of failure that is detected.

If neither recipe nor code based recovery is selected, then no automatic recovery option is associated with the failure of the task. When error is detected, the system stops and reports the error. The user can then apply manual recovery and post-recovery steps. The no-recovery option is then associated with the task at block 970, and the process ends.

Although only a few specific recovery options were described, one of skill in the art would understand that the automatic recovery option is open ended. Other recovery options may be utilized, including undoing prior actions, or restarting certain processes.

The ability to provide a recovery option, which is presented to the user on a separate portion of the screen and easily visible, keeps the main recipe uncluttered and also enables the use of different recovery options for different process steps. This creates a flexible and failure resistant recipe. Additionally, the present system provides an easy way to implement a process for recovery. Without requiring code, a user can add any recovery option/recipe on the fly, at any point of the development. By using the graphical interface for the recipe, in one embodiment, the recovery option can be added without requiring code recompilation.

Figure 10:
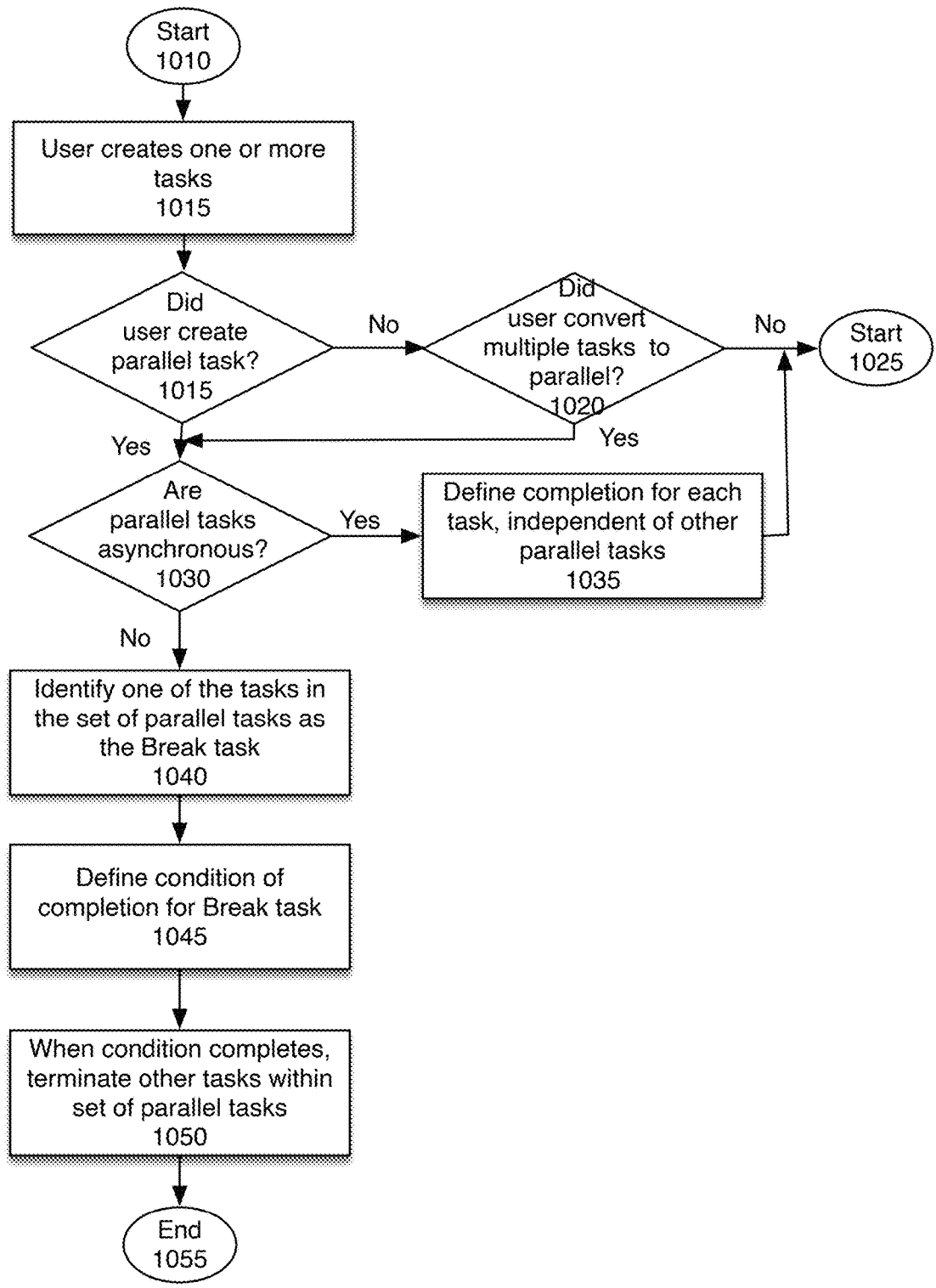
FIG. 10 is a flowchart of one embodiment of using parallel tasks.

FIG. 10 is a flowchart of one embodiment of using parallel tasks. The process starts at block 1010. At block 1015, the user creates one or more tasks, as discussed above.

At block 1015, the process determines whether the user created a parallel task. The user may choose a parallel task option when creating a new step in a recipe. If so, the process continues to block 1030. If the user did not choose a parallel task, at block 1020, the process determines at block 1025 whether the user is converting existing sets of multiple tasks into parallel tasks. In one embodiment, the user may select one or more tasks and indicate that they should be performed in parallel, rather than creating the tasks as parallel tasks initially. If so, the process continues to block 1030. If the user is not converting to a parallel task the process ends at block 1025, since no parallel task process is being created.

At block 1030, the user sets the parallel tasks as synchronous or asynchronous. Asynchronous parallel tasks are executed independently, without any connection between the executions. If the tasks are asynchronous, at block 1035 each task has a completion state, independent of the other parallel tasks. In one embodiment, a wait-for command may be used if all asynchronous parallel tasks should be executed prior to another step. The process then ends at block 1025.

If the parallel tasks are not asynchronous, at block 1040, one of the tasks is identified as the Break task. The Break task is the key task in the set, and it has an associated completion condition, at block 1045. When the condition associated with the break task is completed, at block 1050, the other tasks within the set of parallel tasks are terminated, and the process can continue. The process then ends at block 1025.

Parallel tasks are illustrated in one embodiment side-by-side, with connections to each other. The break task is flagged so the user can visually identify the key task in the set.

Figure 11:
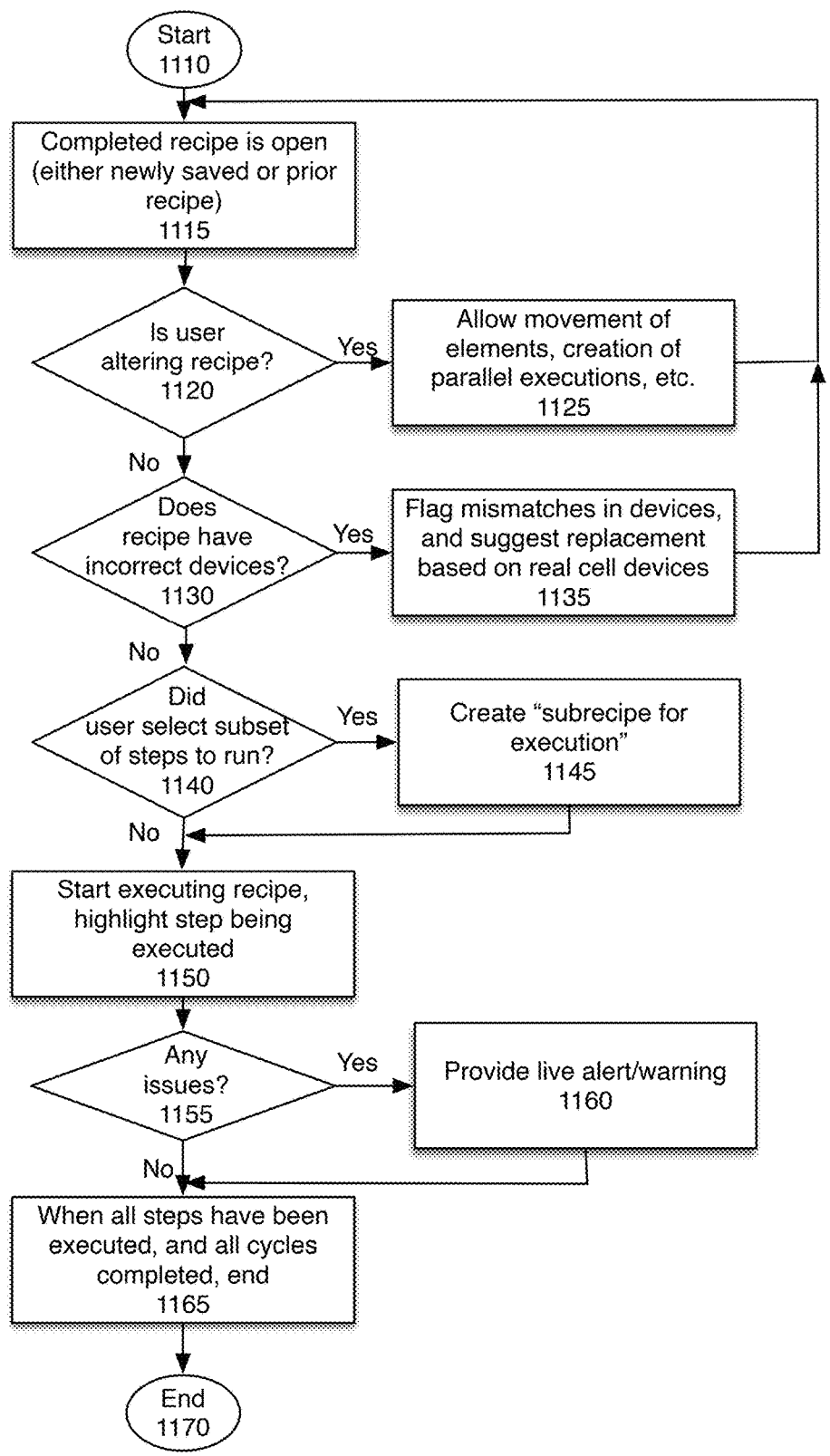
FIG. 11 is a flowchart of one embodiment of executing a recipe.

FIG. 11 is a flowchart of one embodiment of executing a recipe. The process starts at block 1110. After a recipe is completed, the user may execute the recipe on the robotic cell. In one embodiment, prior to execution on the robotic cell, the user can create, optimize, and debug a recipe on a virtual representation of the cell. In one embodiment, the same code can be applied to the virtual representation, and it parallels the real robotic cell.

At block 1115, a completed recipe is open. The completed recipe may be a newly created or saved recipe, a previous recipe, or a newly imported recipe.

At block 1120, the process determines whether the user is editing the recipe. A recipe may be edited at any time. If so, the user may be permitted to move tasks, create parallel executions, add or delete steps, etc. This kind of visual representation of a recipe and permitting fully featured editing of the recipe at any point provides additional flexibility. In one embodiment, the system provides automatic versioning, and saves prior versions of recipes. This enables the user to unwind changes at any time. The process then returns to block 1115.

If the user is not altering the recipe, the process at block 1130 determines whether all of the devices in the recipe are reflected in the current robotic cell, e.g., whether there are any incorrect devices in the recipe. As noted above, recipes may be shared or imported. Sometimes, when a recipe is imported the set of devices identified in the various steps of the recipe may not be present on the new robotic cell. If that is the case, at block 1135, the mismatches are flagged. In one embodiment, the process suggests replacements based on the actual available elements. In one embodiment, if there is an equivalent element (for example the recipe calls for a particular camera, and there is a camera with the same features but of a different brand) the system may provide automatic substitutions. In one embodiment, such substitutions are flagged so the user is aware of them. The process then returns to block 1115.

If the recipe has the correct devices, at block 1140 the process determines whether the user chose a subset of steps to run. Instead of running the whole recipe, the user may choose a subset of steps to run. This again provides the ability to test a change, or a problematic issue without having to run the entire recipe. This flexibility means that the user can retain the entire recipe, and visually see all of its parts, but can start the recipe from any point, and end at any point. In one embodiment, the system creates a sub-recipe for execution at block 1145. In one embodiment, the sub-recipe is not actually a separate file, but rather a set-up that initiates the devices in the robotic cell at the starting point (e.g., the ending point of the portion before the selected steps.) The process then continues to block 1150. This "subrecipe for execution" is treated as "the recipe."

At block 1150, the system executes the recipe. In one embodiment, each step is highlighted as it is being executed.

At block 1155, the process determines whether there are any issues. If so, in one embodiment, the recovery steps described above are executed. The user is also alerted. Live alerts and warnings are provided during execution.

At block 1165, when all steps have been executed, and all cycles completed, the execution finishes. Cycles in this context are the number of complete executions of the recipe that are used. Additionally, there may be loops within the recipe itself, as discussed above. The process ends at block 1170.

Figure 12A:
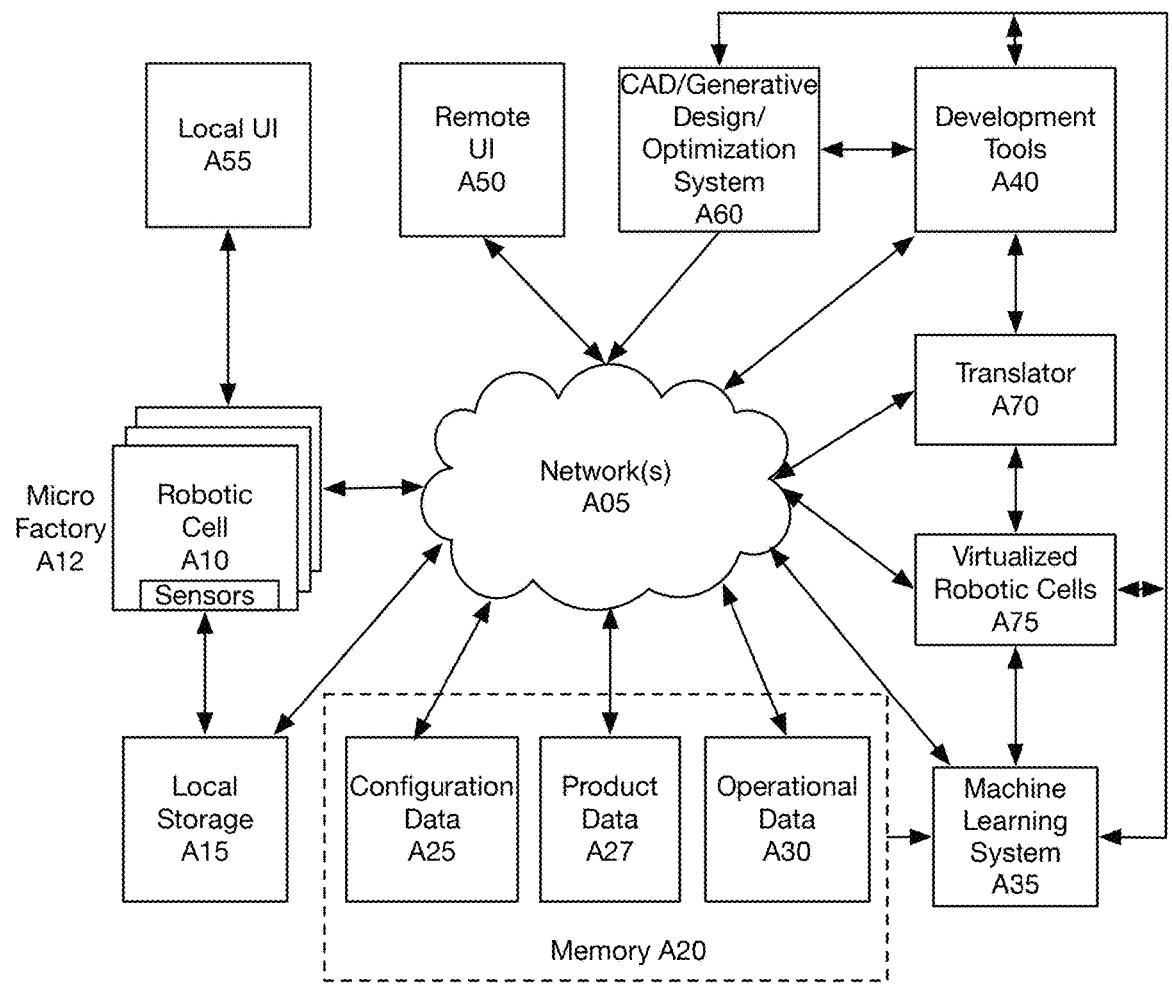
FIG. 12A is a block diagram of an environment in which the present system may be used.

FIG. 12A is a block diagram of an environment in which the present system may be used. In one embodiment, robotic cells A10 include one or more individual robotic cells which together form the software defined manufacturing line, or micro factory A12. In one embodiment, individual robotic cells A10 may be linked via conveyors, and reverse conveyors, so that a single item being manufactured or assembled through the micro factory passes through multiple robotic cells A10 (or multiple times through one or more cells A10). The robotic cells A10 may provide manufacturing, assembly, inspection, and/or testing of products.

In one embodiment, the robotic cells A10 are controlled by software. In one embodiment, the configuration and control data for the robotic cells A10 are applied to the cell from memory A20. In one embodiment, the memory A20 may be part of a remote system, coupled to the robotic cells A10 via network A05. The configuration data A25 defines the configuration for each robotic cell A10 and the manufacturing line. The configuration data can include software configuration and any other configuration that is controllable through software. For example, a home thermostat has a configuration (the temperature target set-point) which is not itself software, but in some thermostats that set-point configuration can be controlled/modified via software control. Thus, the configuration management can encompass data that is controllable through software, even if it controls hardware settings.

In one embodiment, configuration data may include other configuration elements that may be controlled through software, such as setpoints, and other settings. The robotic cells A10 collect operational data while being calibrated, tested, or used. This operational data is stored in memory A20 and used by machine learning system A35. In one embodiment, local storage A15 provides backup for configuration data for the robotic cell, as well as operational data produced by the robotic cell while it is in use. Local storage A15 in one embodiment acts as a buffer for memory A20. In one embodiment, if the robotic cell A10 becomes disconnected from the network A05, it may continue to operate and collect real time operational data, using local storage A15.

In one embodiment, because the cells are software configured, a single robotic cell A10 may perform multiple stages in the manufacturing process and may be reconfigured during the manufacturing process. In one embodiment, this also enables the substitution of robotic cells A10 in a micro factory during manufacturing without extensive manual reconfiguration. In fact, extensive reconfiguration may be done through automated methods under software control. In one embodiment, this also permits the addition of cells into a micro factory.

In one embodiment, robotic cells A10 include a local user interface A55, enabling interaction with the robotic cell A10 on the manufacturing floor. In one embodiment, the local user interface A55 may provide a joystick-based interaction, enabling direct control of the elements of the robotic cell. In one embodiment, the local user interface may include virtual reality controllers, detected hand gestures, or any other multiple-degree of freedom input device (mouse, 3d space mouse, etc.). In one embodiment, the local user interface A55 may enable direct manipulation of the robot arms by having a human physically manipulate them, when using a human-safe robot.

In one embodiment, in addition to the local UI A55 there may be a remote UI A50, coupled to the robotic cell A10 via a network A05. The remote user interface A50 may be a portable user interface, such as a tablet. The remote user interface A50 may be linked to the robotic cell A10 via a local area network (LAN), personal area network (PAN), or another type of network. In one embodiment, some remote UIs A50 may require proximity to a robotic cell A10, while other remote UIs A50 may be operable from anywhere. In one embodiment, the functionality and control elements presented on a user interface may vary based on one or more of the robotic cell A10, the configuration of the robotic cell A10, the identity/qualifications of the individual who is logged into the user interface, and proximity to the physical cell. In one embodiment, the local UI A55 and remote UI A50 provide identical base layouts and functionality, reducing complexity for the operators interacting with the robotic cells A10. In one embodiment, the user interface provides a unified human-machine interface (HMI) across all robotic cell types and configurations.

In one embodiment, for the production of an end product, the process starts with development tools A40. In one embodiment, these tools may be made available to designers remotely. In one embodiment, these tools may be provided online, through a Software as a Service (Saas) type interface. In one embodiment, the development tools A40 enable the creation of a model, digital twin, simulation, design, and/or configuration of a manufacturing line including one or more robotic cells A10. In one embodiment, teach robotic cell A10 has certain capabilities. The development tools A10 enable a user to create a manufacturing line using one or more of the robotic cells A10 to create the end product.

In one embodiment, CAD/Generative Design/Optimization System A60 may be used. In one embodiment, generative design systems use data about the manufacturing capabilities of the robotic cells to create a CAD design, model, digital twin, simulation, or other configuration for the end product to be made. In one embodiment, machine learning may be used. The machine learning might be based on one or more of: learning from prior projects and data, or simulations. In one embodiment, the machine learning system may be trained with simulations of physics, e.g., synthetic training data. In one embodiment, generative adversarial networks (GANs) may be used to improve the quality of simulations and ML training.

In one embodiment, optimization methods may be used, to minimize the manufacturing steps and/or likelihood of design issues, based on the knowledge of the robotic cell capabilities. In one embodiment, when using CAD/Generative design/optimization system A60 the system may take into account the manufacturing/assembly limitations of the robotic cells A10 in designing the end product. In one embodiment, the CAD/Generative Design/Optimization System A60 may receive data from development tools A40 and may iterate the end product design based on issues identified through the development tools A40. In one embodiment, the output of the development tools A40 is a sequence of operations for each robotic cell in a manufacturing line.

The Generative Design or Optimization A60 in one embodiment uses Machine Learning to improve the design. The machine learning system (ML) in one embodiment is based on learning from prior projects and data, or might be based on simulations, or both. The ML in one embodiment may be trained with simulations of physics rather than using real world data. This is referred to as synthetic training data.

Once a design is generated, translator A70 translates the sequence of operations to control commands for an individual robotic cell. In one embodiment, the output of development tools A40 is in a language which describes the configuration and actions taken by a robotic cell. Because each individual robotic cell includes multiple elements, which may utilize different control languages, the translation is quite complex. Furthermore, different robotic cells performing the same sequence of operations may have elements that are from different manufacturers or have different configurations. For example, a robotic arm may have two, three, or four movement joints, and the joints may have different limitations. Thus, a single command in the sequence of operations may be translated differently for each individual robotic cell.

The translated control commands may be applied to a virtualized robotic cell A75. The virtualized robotic cell A75 may represent the individual configured robotic cell, and may be used for testing, and verification. In one embodiment, virtualized robotic cells A75 may use operational data A30 from actual robotic cells A10 to enable a user to view the actions of a physical robotic cell A10 remotely. In one embodiment, a user may preview the robotic cell's actions during a process, may track the actual actions during the process, and/or review the actual actions after the process using virtualized robotic cells A75. In one embodiment, stepwise debugging can also occur while controlling the real robotic cell. In one embodiment, the virtualized robotic cell may operate in slave mode, where the virtual robotic cell precisely tracks the actions of the physical robotic cell.

The output of the translator A70, once validated and verified, is stored as configuration data A25. The configuration data A25 is applied to physical robotic cells, as discussed above.

In one embodiment, a machine learning system A35 is used to provide data for iterative learning, and improvements to the process.

In one embodiment, although the elements here are shown as individual elements one of skill in the art would understand that the design tools A60, development tools A40, translator A70, virtualized robotic cells A75, and machine learning system A35 are implemented on one or more computer systems. The computer systems may be stand-alone devices, servers, or cloud-based systems which are accessed through network A05. In one embodiment, the elements described may be implemented on a single server system. In one embodiment, the elements described may be implemented on multiple unrelated computer/server systems. In one embodiment, though only a single block is illustrated for an element like development tools A40 the real tool may be distributed over multiple devices.

Figure 12B:
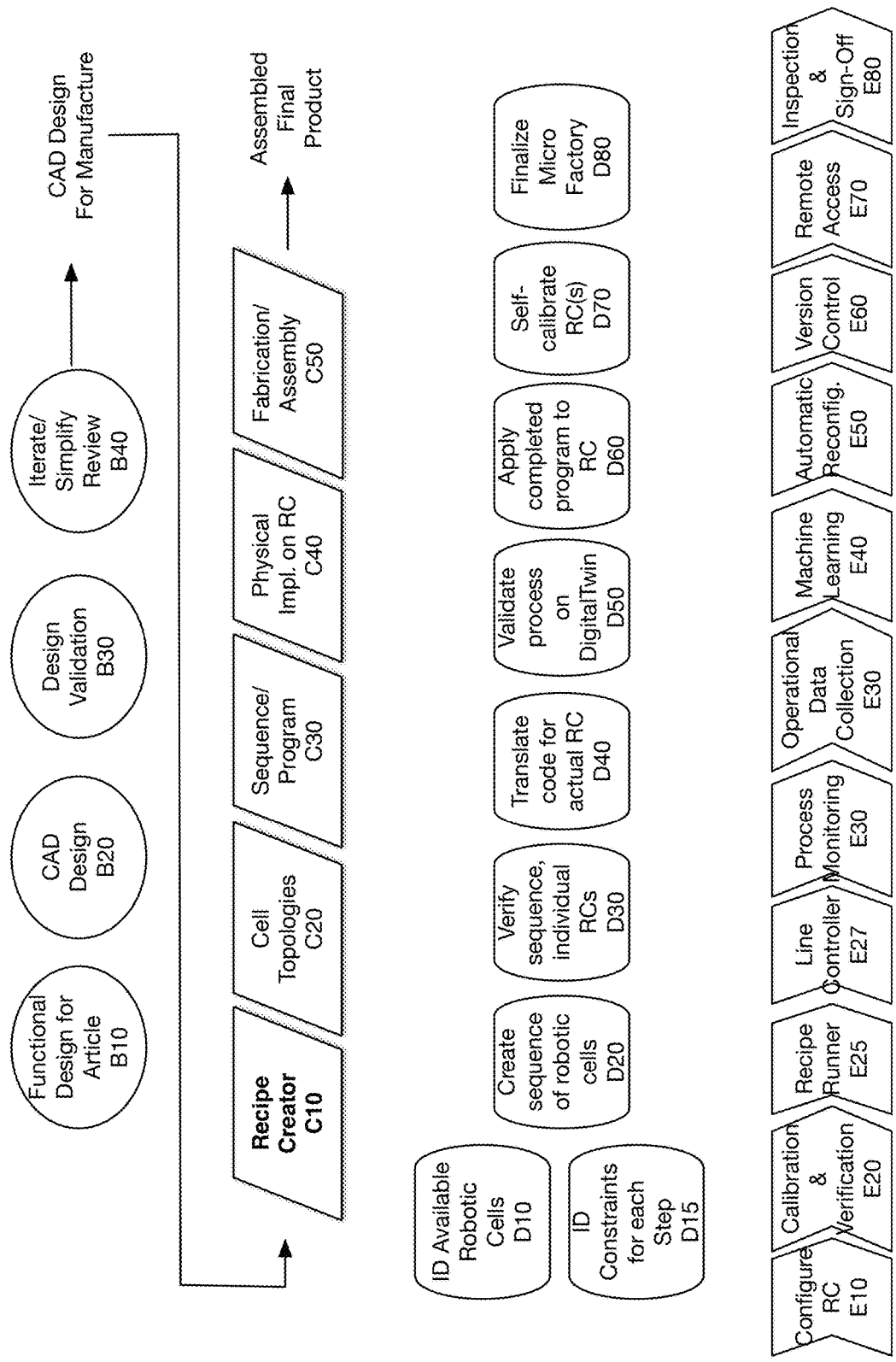
FIG. 12B is a system diagram of one embodiment of building a robotic assembly line.

FIG. 12B is a simplified block diagram of the process which utilizes the micro factory comprising one or more robotic cells to create assembled final products. In some embodiments, the robotic cells may be inserted into a traditional manufacturing line, to take over some sub-portions of the manufacturing. The process includes the layers of manufacturing, from recipe creation via recipe creator C10 to fabrication/assembly via micro factory C50. Although a complete process is shown, from initial concept/functional design through completed manufacturing, one of skill in the art would understand that the system may implement a subset of these processes and include a subset of these features.

Figure 13:
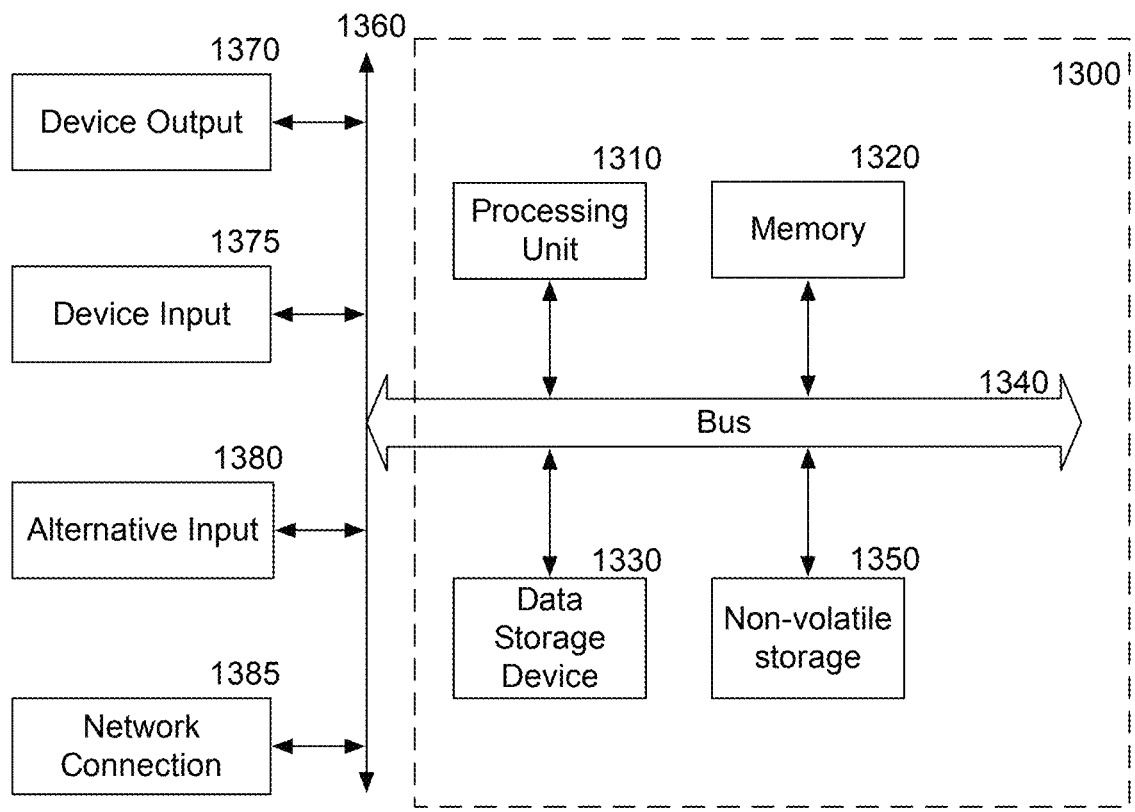
FIG. 13 is a block diagram of one embodiment of a computer system that may be used with the present design.

FIG. 13 is a block diagram of one embodiment of a computer system that may be used with the present invention. It will be apparent to those of ordinary skill in the art, however that other alternative systems of various system architectures may also be used.

The data processing system illustrated in FIG. 13 includes a bus or other internal communication means 1340 for communicating information, and a processing unit 1310 coupled to the bus 1340 for processing information. The processing unit 1310 may be a central processing unit (CPU), a digital signal processor (DSP), or another type of processing unit 1310.

The system further includes, in one embodiment, a random access memory (RAM) or other volatile storage device 1320 (referred to as memory), coupled to bus 1340 for storing information and instructions to be executed by processor 1310. Main memory 1320 may also be used for storing temporary variables or other intermediate information during execution of instructions by processing unit 1310.

The system also comprises in one embodiment a read only memory (ROM) 1350 and/or static storage device 1350 coupled to bus 1340 for storing static information and instructions for processor 1310. In one embodiment, the system also includes a data storage device 1330 such as a magnetic disk or optical disk and its corresponding disk drive, or Flash memory or other storage which is capable of storing data when no power is supplied to the system. Data storage device 1330 in one embodiment is coupled to bus 1340 for storing information and instructions.

The system may further be coupled to an output device 1370, such as a cathode ray tube (CRT) or a liquid crystal display (LCD) coupled to bus 1340 through bus 1360 for outputting information. The output device 1370 may be a visual output device, an audio output device, and/or tactile output device (e.g., vibrations, etc.)

An input device 1375 may be coupled to the bus 1360. The input device 1375 may be an alphanumeric input device, such as a keyboard including alphanumeric and other keys, for enabling a user to communicate information and command selections to processing unit 1310. An additional user input device 1380 may further be included. One such user input device 1380 is cursor control device 1380, such as a mouse, a trackball, stylus, cursor direction keys, or touch screen, may be coupled to bus 1340 through bus 1360 for communicating direction information and command selections to processing unit 1310, and for controlling movement on display device 1370.

Another device, which may optionally be coupled to computer system 1300, is a network device 1385 for accessing other nodes of a distributed system via a network. The communication device 1385 may include any of a number of commercially available networking peripheral devices such as those used for coupling to an Ethernet, token ring, Internet, or wide area network, personal area network, wireless network, or other method of accessing other devices. The communication device 1385 may further be a null-modem connection, or any other mechanism that provides connectivity between the computer system 1300 and the outside world.

Note that any or all of the components of this system illustrated in FIG. 13 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1320, mass storage device 1330, or other storage medium locally or remotely accessible to processor 1310.

It will be apparent to those of ordinary skill in the art that the system, method, and process described herein can be implemented as software stored in main memory 1320 or read only memory 1350 and executed by processor 1310. This control logic or software may also be resident on an article of manufacture comprising a computer readable medium having computer readable program code embodied therein and being readable by the mass storage device 1330 and for causing the processor 1310 to operate in accordance with the methods and teachings herein.

The present invention may also be embodied in a handheld or portable device containing a subset of the computer hardware components described above. For example, the handheld device may be configured to contain only the bus 1340, the processor 1310, and memory 1350 and/or 1320.

The handheld device may be configured to include a set of buttons or input signaling components with which a user may select from a set of available options. These could be considered input device #1 1375 or input device #2 1380. The handheld device may also be configured to include an output device 1370 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1310, a data storage device 1330, a bus 1340, and a memory 1320, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1385.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1310. A machine-readable medium includes any mechanism for storing information in a form readable by a machine (e.g., a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method to build a recipe to control a software controlled robotic cell, the method comprising:
   prompting selection of a component, the component representing a device in a robotic cell;
   when the component has parameters, displaying the parameters in response to the selection, and enabling setting of the parameters;
   prompting selection of an action on the component;
   validating the recipe, to verify that all recipe actions are supported by components of the robotic cell;
   packaging the recipe including identification of the components and the parameters of the components, and the actions, into a packaged recipe; and
   saving the recipe, the recipe designed to be run on a virtual device and on the robotic cell.

2. The method of claim 1, wherein one of the parameters is a target position, and the target position is entered via one of: coordinates and a teach pendant.

3. The method of claim 1, wherein one of the parameters is a target position, and the target position is entered by selection from a list.

4. The method of claim 3, wherein the list of parameters is a set of relative parameters.

5. The method of claim 1, wherein one of the parameters is a target position, and the target position is selected based on vision, the vision comprising data from a camera.

6. The method of claim 1, wherein one of the parameters is a target position, and the target position is selected based on a part being assembled by the robotic cell, wherein a position of the part is identified using one of: coordinates, list, and vision.

7. The method of claim 1, further comprising:
   identifying that the component has a plurality of sub-parts;
   determining a removed sub-part of the component;
   identifying dependent elements of the removed sub-part of the component; and
   removing the dependent elements.

8. The method of claim 1, further comprising:
   determining that one or more of the recipe actions are not supported the robotic cell; and
   flagging a failure of the recipe.

9. The method of claim 8, further comprising:
   determining whether a correction can be applied to the recipe, wherein the flagging of the failure occurs when the recipe cannot be automatically corrected.

10. The method of claim 9, wherein the correction comprises one or both of: updating the one or more recipe actions to be supported by the components of the robotic cell and reconfiguring the robotic cell to support the one or more recipe actions.

11. The method of claim 1, wherein the saving comprises one or more of:
    saving the recipe on the robotic cell;
    duplicating the recipe to an edge device;
    duplicating the recipe to a cloud system; and
    exporting the recipe.

12. The method of claim 1, further comprising:
    adding a recovery option to the action, the recovery option enabling recovery from a failed action.

13. The method of claim 12, wherein the recovery option comprises a set of one or more actions, to reset the robotic cell after the failed action.

14. The method of claim 1, further comprising:
    selecting a plurality of recipe steps; and
    adjusting an order of execution of the plurality of recipe steps, wherein the adjusting comprises: running in parallel, running asynchronously, and running conditionally.

15. A method to create software to control a physical robotic cell, the method executed on a computer and comprising:
    receiving selection of a component, the component representing an item in a robotic cell;
    when the component has parameters, automatically displaying the parameters in response to the selection;
    receiving selection of an action to be executed by the component;
    receiving an indication that a recipe comprising at least one action is complete;

validating the recipe to verify that the at least one or more actions of the recipe are supported by components of the robotic cell;

packaging the recipe including identification of the components and the parameters of the components, and the actions, into a packaged recipe; and saving the recipe, the recipe designed to be run on a virtual device and on the physical robotic cell.

16. The method of claim 15, wherein one of the parameters is a target position, and the target position is entered via one of: coordinates, a teach pendant, selection from a list.

17. The method of claim 16, wherein the list of parameter is one or more of: set of relative parameters, and a target position, and wherein the target position is selected based on one of: vision data from a camera in the robotic cell, a part being assembled by the robotic cell, wherein a position of the part is identified using one of: coordinates, list, and vision.

18. The method of claim 15, further comprising:

receiving a command to remove a selected sub-part of the component from the robotic cell;

identifying dependent elements of the removed sub-part of the component; and removing the dependent elements.

19. The method of claim 15, further comprising:

determining that one or more of the recipe actions are not supported by the robotic cell;

determining whether a correction can be applied to the recipe, wherein the correction comprises one or both of: updating the one or more recipe actions to have the robotic cell components support the recipe action, and reconfiguring the robotic cell components to support the one or more recipe actions; and wherein the recipe is flagged as a failed recipe when the recipe cannot be automatically corrected.

20. The method of claim 15, further comprising:

adding a recovery option to the action, the recovery option enabling recovery from a failed action, wherein the recovery option comprises a set of one or more actions to reset the robotic cell after the failed action.

\* \* \* \* \*